(12) United States Patent
Worley, III et al.

(10) Patent No.: US 9,996,972 B1
(45) Date of Patent: Jun. 12, 2018

(54) USER/OBJECT INTERACTIONS IN AN AUGMENTED REALITY ENVIRONMENT

(75) Inventors: William Spencer Worley, III, Half Moon Bay, CA (US); Edward Dietz Crump, Santa Cruz, CA (US); Colter E. Cederlof, San Jose, CA (US); Christopher Coley, Morgan Hill, CA (US); Robert A. Yuan, Belmont, CA (US)

(73) Assignee: Amazon Technologies, Inc., Seattle, WA (US)

( * ) Notice: Subject to any disclaimer, the term of this patent is extended or adjusted under 35 U.S.C. 154(b) by 106 days.

(21) Appl. No.: 13/157,985

(22) Filed: Jun. 10, 2011

(51) Int. Cl.
*G06T 19/00* (2011.01)
*G06T 7/00* (2017.01)
*G06T 11/00* (2006.01)
*G06F 3/01* (2006.01)
*G06F 3/00* (2006.01)

(52) U.S. Cl.
CPC ............ *G06T 19/006* (2013.01); *G06F 3/011* (2013.01); *G06T 7/00* (2013.01); *G06T 11/00* (2013.01); *G06T 19/00* (2013.01); *G06F 3/00* (2013.01); *G06F 3/017* (2013.01)

(58) Field of Classification Search
USPC ......................................................... 345/633
See application file for complete search history.

(56) References Cited

U.S. PATENT DOCUMENTS

| | | | |
|---|---|---|---|
| 5,619,631 A | 4/1997 | Schott | |
| 5,959,869 A * | 9/1999 | Miller | .................... G06Q 30/02 221/9 |
| 8,412,560 B1 | 4/2013 | Masud et al. | |
| 8,499,038 B1 | 7/2013 | Vucurevich | |
| 2002/0075282 A1* | 6/2002 | Vetterli et al. | ................ 345/632 |
| 2003/0033153 A1 | 2/2003 | Olson et al. | |
| 2003/0101137 A1* | 5/2003 | Wronski, Jr. | .......... G06Q 20/00 705/44 |
| 2005/0273417 A1* | 12/2005 | Budish | ............................ 705/37 |
| 2006/0139314 A1* | 6/2006 | Bell | .............................. 345/156 |
| 2007/0033098 A1 | 2/2007 | Peters et al. | |
| 2007/0067290 A1* | 3/2007 | Makela | ............................ 707/6 |
| 2007/0115484 A1 | 5/2007 | Huang et al. | |
| 2007/0195097 A1 | 8/2007 | Heesemans | |
| 2007/0214249 A1 | 9/2007 | Ahmed et al. | |
| 2007/0225860 A1* | 9/2007 | Sheppard et al. | ............ 700/236 |
| 2007/0294281 A1* | 12/2007 | Ward et al. | ................ 707/102 |
| 2008/0004981 A1 | 1/2008 | Gopalpur et al. | |
| 2008/0167818 A1 | 7/2008 | Kimber et al. | |

(Continued)

OTHER PUBLICATIONS

"Requisition/Purchase Order Life Cycle—LSUNO" LSU Health Sciences Center New Orleans website, Apr. 1, 2010, Accessed Sep. 18, 2013 archive.org <http://web.archive.org/web/20100401065259/http://www.lsuhsc.edu/PS/Support/PDF%20manuals/Requisitions-Purchase%20Order%20Life%20Cycle%20LSUNO.pdf>.*

(Continued)

*Primary Examiner* — Barry Drennan
*Assistant Examiner* — Schiller Hill
(74) *Attorney, Agent, or Firm* — Lee & Hayes, PLLC

(57) ABSTRACT

An augmented reality environment allows interaction between virtual and real objects. By monitoring user actions with the augmented reality environment various functions are provided to users. Users may buy or sell items with a gesture, check inventory of objects in the augmented reality environment, view advertisements, and so forth.

24 Claims, 17 Drawing Sheets

(56) References Cited

U.S. PATENT DOCUMENTS

| | | | |
|---|---|---|---|
| 2008/0170776 A1* | 7/2008 | Albertson et al. | 382/154 |
| 2008/0189147 A1 | 8/2008 | Bartlett | |
| 2008/0229194 A1 | 9/2008 | Boler et al. | |
| 2009/0063307 A1* | 3/2009 | Groenovelt | G06Q 10/087 705/28 |
| 2009/0133051 A1 | 5/2009 | Hildreth | |
| 2009/0207322 A1 | 8/2009 | Mizuuchi et al. | |
| 2009/0217211 A1 | 8/2009 | Hildreth et al. | |
| 2010/0045869 A1 | 2/2010 | Baseley et al. | |
| 2010/0229125 A1 | 9/2010 | Cha | |
| 2010/0265311 A1 | 10/2010 | Carpenter, Jr. et al. | |
| 2011/0141011 A1* | 6/2011 | Lashina | G06F 3/013 345/156 |
| 2011/0178887 A1 | 7/2011 | O'Connor et al. | |
| 2011/0184735 A1 | 7/2011 | Flaks et al. | |
| 2011/0205242 A1 | 8/2011 | Friesen | |
| 2011/0246064 A1 | 10/2011 | Nicholson | |
| 2011/0313768 A1* | 12/2011 | Klein | G06F 3/017 704/251 |
| 2012/0062471 A1 | 3/2012 | Poulidis et al. | |
| 2012/0113140 A1 | 5/2012 | Hilliges et al. | |
| 2012/0154557 A1 | 6/2012 | Perez et al. | |
| 2012/0223885 A1 | 9/2012 | Perez | |

OTHER PUBLICATIONS

Andrienko, Gennady L., and Natalia V. Andrienko. "Interactive maps for visual data exploration." International Journal of Geographical Information Science 13.4 (1999): 355-374.*

Admin "Hand Signals Used in the Futures Trading Pits." MYSMP. Apr. 20, 2008. Web. Mar. 18, 2016. <http://www.mysmp.com/futures/futures-hand-signals.html>. Internet Archive <http://web.archive.org/web/20081025024227/http://www.mysmp.com/futures/futures-hand-signals.html>.*

Pinhanez, "The Everywhere Displays Projector: A Device to Create Ubiquitous Graphical Interfaces", IBM Thomas Watson Research Center, Ubicomp 2001, 18 pages.

Final Office Action for U.S. Appl. No. 13/158,022, dated Mar. 28, 2014, William Spencer Worley III, "User/Object Interactions in an Augmented Reality Environment", 77 pages.

"The Postal Store at USPS.com.", retrieved on Sep. 13, 2013 at <<http://shop.usps.com/webapp/wcs/stores/servlet!ProductCategoryDisplay?langId=-1&storeId=10001&catalogId=10152&categoryId=13354&parent_category_rn=11820&top_category=11820>>, The United States Postal Service Website, Feb. 9, 2009, 1 page u <>.

Office Action for U.S. Appl. No. 13/158,022, dated Sep. 18, 2013, William Spencer Worley III, "User/Object Interactions in an Augmented Reality Environment", 48 pages.

"The Postal Store at USPS.com.", retrieved on Sep. 13, 2013 at <<http://shop.usps.com/webapp/wcs/stores/servlet!ProductCategoryDisplay?langId=-1&storeId=10001&catalogId=10152&categoryId=13354&parent_category_rn=11820&top_category=11820>>, The United States Postal Service Website, Feb. 9, 2009, 1 page u <>.

Office Action for U.S. Appl. No. 13/158,022, dated Oct. 8, 2014, William Spencer Worley III, "User/Object Interactions in an Augmented Reality Environment", 88 pages.

Office action for U.S. Appl. No. 13/158,062, dated Jul. 30, 2014, Worley III et al., "User/Object Interactions in an Augmented Reality Environment", 28 pages.

Final Office Action for U.S. Appl. No. 13/158,062, dated Jan. 27, 2015, William Spencer Worley III, "User/Object Interactions in an Augmented Reality Environment", 36 pages.

Office Action for U.S. Appl. No. 13/158,022, dated Apr. 30, 2015, William Spencer Worley III, User/Object Interactions in an Augmented Reality Environment, 81 pages.

Office Action for U.S. Appl. No. 13/425,151, dated Apr. 7, 2015, William Spencer Worley III, "Augmented Reality Device", 39 pages.

Office action for U.S. Appl. No. 13/425,151, dated Dec. 24, 2015, Worley III et al., "Augmented Reality Device", 47 pages.

Office action for U.S. Appl. No. 13/158,022, dated Dec. 3, 2015, Worley III et al., "User/Object Interactions in an Augmented Reality Environment", 89 pages.

Non-Final Office action for U.S. Appl. No. 13/158,062, dated Sep. 17, 2015, Inventor #1, "User/Object Interactions in an Augmented Reality Environment", 43 pages.

Office action for U.S. Appl. No. 13/158,022, dated May 4, 2017, Worley III et al., "User/Object Interactions in an Augmented Reality Environment", 80 pages.

Cotting, et al., "Embedding imperceptible patterns into projected images for simultaneous acquisition and display", Proceedings of the 3rd IEEE/ACM International Symposium on Mixed and Augmented Reality, IEEE Computer Society, 2004, 10 pages.

Non-Final Office action for U.S. Appl. No. 13/158,062, dated Feb. 22, 2017, Worley, "User/Object Interactions in an Augmented Reality Environment", 54 pages.

Admin, "Futures Hand Signals Definiation and Images", MYSMP, Retreived from <<http://www.mysmp.com/futures/futures-hand-signals.html>>, Apr. 2008, 7 pages.

Office action for U.S. Appl. No. 13/158,062, dated Mar. 24, 2016, Worley III et al., "User/Object Interactions in an Augmented Reality Environment", 51 pages.

Office action for U.S. Appl. No. 13/158,022, dated Apr. 29, 2016, Worley III et al., "User/Object Interactions in an Augmented Reality Environment", 102 pages.

Office action for U.S. Appl. No. 13/425,151, dated Oct. 5, 2016, Worley III et al., "Augmented Reality evice", 47 pages.

Office action for U.S. Appl. No. 13/425,151, datd Oct. 5, 2017, Worley III et al., "Augmented Reality Device", 58 pages.

Final Office Action for U.S. Appl. No. 13/158,062, dated Sep. 7, 2017, William Spencer Worley III, "User/Object Interactions in an Augmented Reality Environment", 58 pages.

Office action for U.S. Appl. No. 13/425,151, dated May 30, 2017, Worley III et al., "Augmented Reality Device", 55 pages.

* cited by examiner

USER/OBJECT INTERACTIONS IN AN AUGMENTED REALITY ENVIRONMENT

BACKGROUND

Augmented reality environments allow interaction among users and real-world objects and virtual or computer-generated objects and information. This merger between the real and virtual worlds paves the way for new interaction opportunities.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
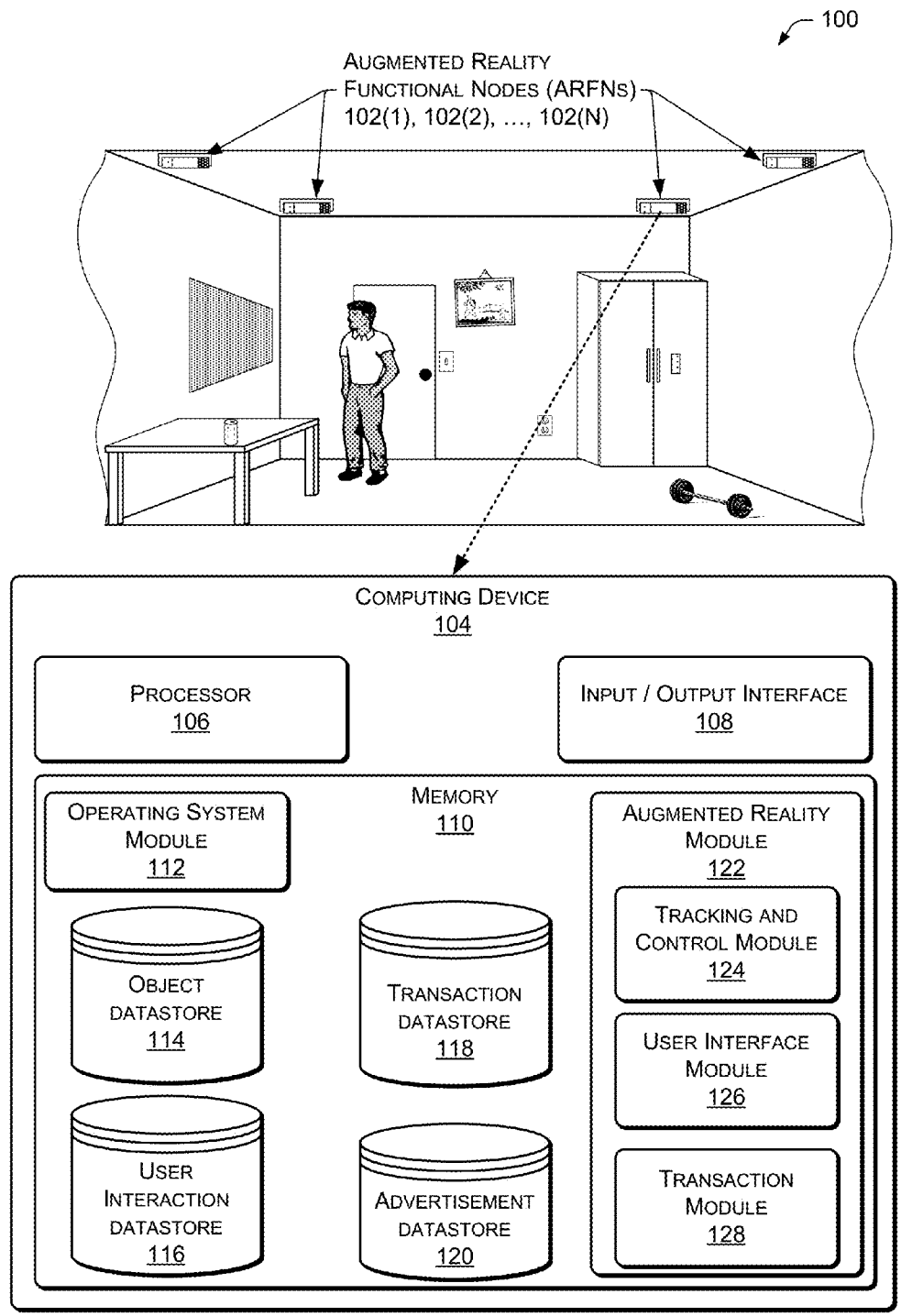
FIG. 1 shows an illustrative scene within an augmented reality environment which includes with an augmented reality functional node and associated computing device.

An augmented reality system may be configured to interact with objects within a scene and generate an augmented reality environment. The augmented reality environment allows for virtual objects and information to merge and interact with tangible real-world objects, and vice versa. Disclosed herein are techniques and devices suitable for providing various interactions and functionality within the augmented reality environment.

The augmented reality system includes a computing device configured to support the augmented reality environment. Movement of real and virtual objects may be tracked, along with a user's interactions with objects. Tracking of real objects allows for inventory management in the augmented reality environment. Requests for an activity within the augmented reality environment may then access this inventory information and direct the activity accordingly. For example, a user request for help in planning and cooking a meal may be based on foodstuffs available in the home at that time. Other uses for the inventory information include generating replenishment orders for objects such as consumables.

By monitoring user interactions with objects in the augmented reality environment, various tasks are more easily performed. A pre-determined gesture made towards a particular object may trigger placement of an order for that object. Likewise, a pre-determined gesture made towards a particular object may trigger an offer for transfer of property rights in the object. The process of offering the object may include presenting a confirmation to the user to confirm the offering and possibly parameters such as price, type of transfer, and so forth. It is thus possible to allow users to easily buy or sell objects from the augmented reality environment.

The awareness of objects in the augmented reality environment and the interaction of one or more users with those objects also provides an advertising presentation opportunity. As the user interacts with various objects in the environment, advertisements associated with the objects may be presented. For example, when a user picks up a beverage can, an advertisement for a new flavor of cola may be presented. Details about the interaction may be used to determine a level of interest in the advertisement. Furthermore, upon issuing a pre-determined gesture, the user may initiate purchase or additional inquiry about the goods or service presented in the advertisement.

As described herein for illustration and not by way of limitation, the augmented reality input and output may be provided at least in part by a combination of a structured light source, such as an image projector configured to generate structured light patterns and a camera to image those patterns. The projector and camera may further be incorporated into a single unit and designated as an augmented reality functional node (ARFN). In other implementations, other combinations of elements such as projectors, cameras, microphones, ultrasound transducers, depth sensing cameras, weight sensors, touch sensors, tactile output devices, and so forth may be also be present within or coupled to the ARFN. For convenience, and not by way of limitation, the examples in this disclosure refer to the use of structured light for the characterization of the physical environment of the scene including objects therein. However, in addition to or in place of structured light, other techniques may be used such as light detection and ranging (LIDAR), optical time-of-flight, ultrasonic ranging, stereoscopic imaging, radar, and so forth either alone or in combination with one another.

Within the augmented reality environment, the ARFN includes an augmented reality module. This module is configured to identify and track objects within the scene, maintain a user interface, and facilitate transactions involving objects in the environment, as discussed in detail below.

Illustrative Environment

FIG. 1 shows an illustrative augmented reality environment 100 which includes one or more augmented reality functional nodes (ARFNs) 102(1), 102(2), . . . , 102(N) with associated computing devices. In this illustration, multiple ARFNs 102(1)-(N) are positioned in the corners of the ceiling of the room. In other implementations, the ARFNs 102(1)-(N) may be positioned in other locations within the scene. When active, one such ARFN 102 may generate an augmented reality environment incorporating some or all of the items in the scene such as real-world objects. In some implementations, more or fewer ARFNs 102(1)-(N) may be used.

Each of the ARFNs 102(1)-(N) couples to or includes a computing device 104. This computing device 104 may be within the ARFN 102, or disposed at another location and connected to the ARFN 102. The computing device 104 comprises a processor 106, an input/output interface 108, and a memory 110. The processor 106 may comprise one or more processors configured to execute instructions. The instructions may be stored in memory 110, or in other memory accessible to the processor 106.

The input/output interface 108 may be configured to couple the computing device 104 to other components such as projector, cameras, microphones, other ARFNs 102, other computing devices, and so forth. The coupling between the computing device 104 and the devices may be via wire, fiber optic cable, or wireless connection.

The memory 110 may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device.

Several modules such as instructions, datastores, and so forth may be stored within the memory 110 and configured to execute on a processor, such as the processor 106. An operating system module 112 is configured to manage hardware and services within and coupled to the computing device 104 for the benefit of other modules. Modules may be stored in the memory of the ARFN 102, storage devices accessible on the local network, or cloud storage accessible via a wide area network.

An object datastore 114 is configured to maintain information about objects within or accessible by the augmented reality environment. These objects may be tangible real world objects or virtual objects. Tangible objects include items such as tables, chairs, people, pets, food containers, printed books, and so forth. Virtual objects include media content such as songs, movies, electronic books, computer generated scenes, media files, and so forth. Virtual objects may include stored copies of those objects or access rights thereto. The object datastore 114 may include a library of pre-loaded reference objects, as well as objects which are temporally persistent within a particular environment, such as a wall, specific table, user and so forth. The object datastore 114 or the other datastores described below may be stored on one or more of the memory of the ARFN 102, storage devices accessible on the local network, or cloud storage accessible via a wide area network. The object datastore 114 is discussed in more detail below in regards to FIG. 4.

A user interaction datastore 116 is configured to maintain information about interactions between one or more users and one or more objects. The user interaction data within the datastore 116 may be used in some implementations to facilitate additional functions such as receive indications of user selections of advertisements, provide usage data to product suppliers or manufacturers, and so forth. The collection and use of the user interaction data may be limited based at least in part upon the preferences of the user. The user interaction datastore 116 is discussed in more detail below in regards to FIG. 5.

A transaction datastore 118 is configured to maintain information about changes in property rights associated with objects. For example, the datastore 118 may be configured to track the purchase, rental, sale, lease, and so forth of objects. The transaction datastore 118 is discussed in more detail below in regards to FIG. 6.

An advertisement datastore 120 is configured to maintain information about advertisements available to the augmented reality environment. The advertisement datastore 120 is discussed in more detail below in regards to FIG. 7.

An augmented reality module 122 is configured to generate augmented reality output in concert with the physical environment. The module 122 may access one or more of the datastores described herein. A tracking and control module 124 is configured to identify objects including users. This identification may include the use of a camera, structured light, radio frequency identification equipment, and so forth within the ARFN 102. Objects may be identified by shape, text thereon, universal product code (UPC), optical barcode, radio frequency identification tag (RFID), and so forth.

The term object encompasses several categories including unitary, package, group, container, and so forth. Some objects may be unitary in that they are complete in and of themselves, such as a baseball bat or wrench. Some objects may be packages containing a plurality of items which may or may not be identical, such as a twelve-can case of cola or set of different sized wrenches. An object may also be a group of closely interrelated sub-objects, which operate together to form a whole, such as a jigsaw puzzle. An object may also be a container holding other objects, such as a filled tote with the significance being the contents of the tote and not necessarily the container itself.

The category of an object may be determined at least in part by factors including context, prior use, pre-determined data, and so forth. For example in the context of home use and purchase, wine may be considered a unitary object and designated by the bottle not by the case. Similarly, pre-determined data may indicate that totes are used for storage, and as such a user pointing to a tote filled with objects may be determined as a default to be designating the objects within the tote, and not the tote itself.

A user interface module 126 is configured to accept and interpret input and generate output for the user. The ARFN 102 may use a camera, structured light, stereoscopic vision, and so forth to read the input from the user. A transaction module 128 is configured to associate objects with advertisements, facilitate transactions involving third parties such as buying and selling objects, and perform other functions.

Figure 2:
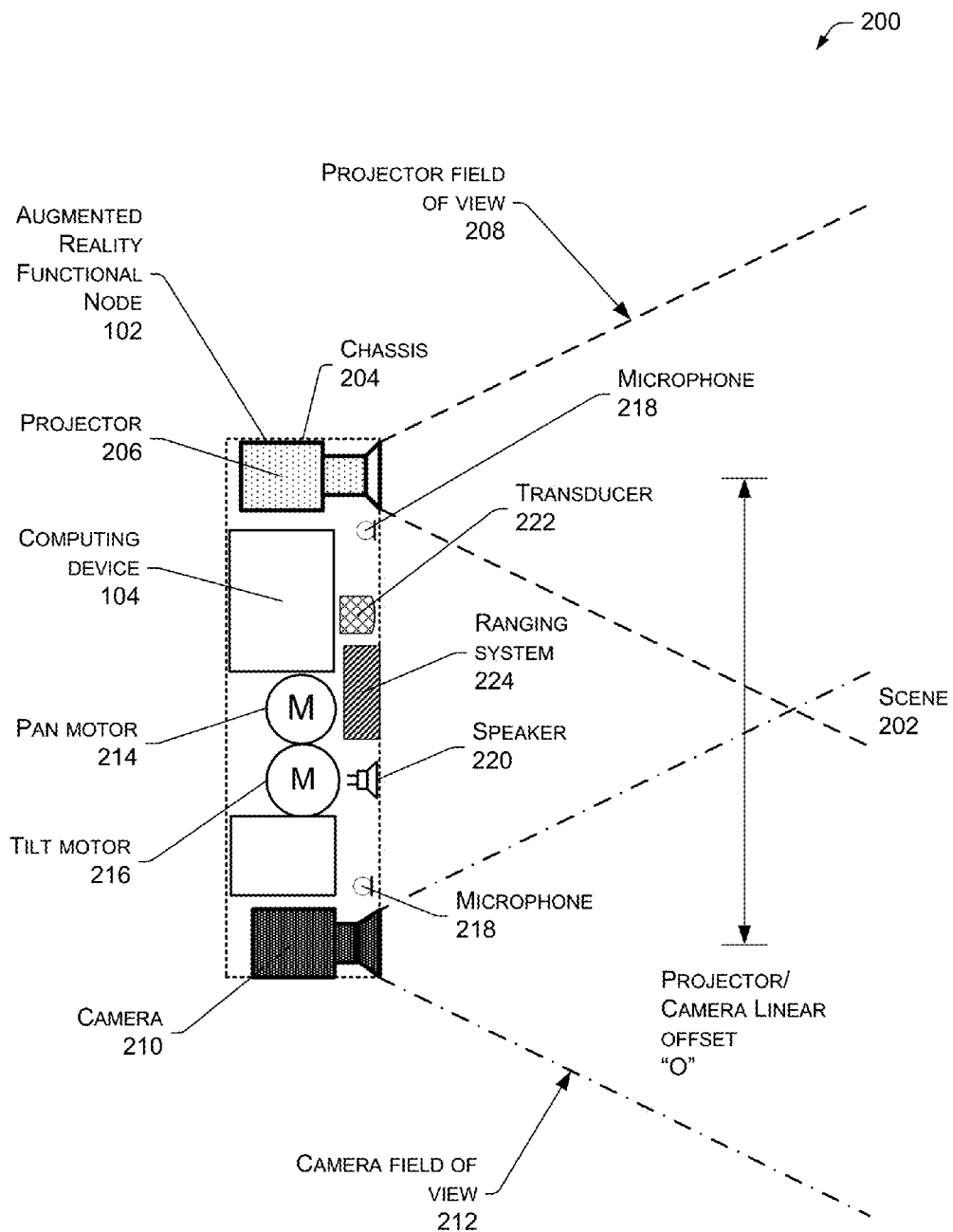
FIG. 2 shows an illustrative augmented reality functional node that includes a computing device, along with other selected components.

FIG. 2 shows an illustrative schematic 200 of one example augmented reality functional node 102 and selected components. The ARFN 102 is configured to scan at least a portion of a scene 202 and the objects therein. The ARFN 102 may also be configured to provide augmented reality output, such as images, sounds, and so forth.

A chassis 204 holds the components of the ARFN 102. Within the chassis 204 may be disposed a projector 206 that generates and projects images into the scene 202. These images may be visible light images perceptible to the user, visible light images imperceptible to the user, images with non-visible light, or a combination thereof. This projector 206 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 206 has a projector field of view 208 which describes a particular solid angle. The projector field of view 208 may vary according to changes in the configuration of the projector. For example, the projector field of view 208 may narrow upon application of an optical zoom to the projector. In some implementations, a plurality of projectors 206 may be used.

A camera 210 may also be disposed within the chassis 204. The camera 210 is configured to image the scene in visible light wavelengths, non-visible light wavelengths, or both. The camera 210 has a camera field of view 212 which describes a particular solid angle. The camera field of view 212 may vary according to changes in the configuration of the camera 210. For example, an optical zoom of the camera may narrow the camera field of view 212. In some implementations, a plurality of cameras 210 may be used.

The chassis 204 may be mounted with a fixed orientation, or be coupled via an actuator to a fixture such that the chassis 204 may move. Actuators may include piezoelectric actuators, motors, linear actuators, and other devices configured to displace or move the chassis 204 or components therein such as the projector 206 and/or the camera 210. For example, in one implementation the actuator may comprise a pan motor 214, tilt motor 216, and so forth. The pan motor 214 is configured to rotate the chassis 204 in a yawing motion. The tilt motor 216 is configured to change the pitch of the chassis 204. By panning and/or tilting the chassis 204, different views of the scene may be acquired. The spatial analysis module 114 may use the different views to monitor objects within the environment.

One or more microphones 218 may be disposed within the chassis 204, or elsewhere within the scene. These microphones 218 may be used to acquire input from the user, for echolocation, location determination of a sound, or to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 220 may also be present to provide for audible output. For example, the speakers 220 may be used to provide output from a text-to-speech module or to playback pre-recorded audio.

A transducer 222 may be present within the ARFN 102, or elsewhere within the environment, and configured to detect and/or generate inaudible signals, such as infrasound or ultrasound. These inaudible signals may be used to provide for signaling between accessory devices and the ARFN 102.

A ranging system 224 may also be provided in the ARFN 102. The ranging system 224 is configured to provide distance information from the ARFN 102 to a scanned object or set of objects. The ranging system 224 may comprise radar, light detection and ranging (LIDAR), ultrasonic ranging, stereoscopic ranging, and so forth. In some implementations the transducer 222, the microphones 218, the speaker 220, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof.

Also shown in this illustration is a projector/camera linear offset designated "O". This is a linear distance between the projector 206 and the camera 210. Placement of the projector 206 and the camera 210 at distance "O" from one another aids in the recovery of structured light data from the scene. The known projector/camera linear offset "O" may also be used to calculate distances, dimensioning, and otherwise aid in the characterization of objects within the scene 202. In other implementations the relative angle and size of the projector field of view 208 and camera field of view 212 may vary. Also, the angle of the projector 206 and the camera 210 relative to the chassis 204 may vary.

In other implementations, the components of the ARFN 102 may be distributed in one or more locations within the environment 100. As mentioned above, microphones 218 and speakers 220 may be distributed throughout the scene. The projector 206 and the camera 210 may also be located in separate chassis 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

Figure 3:
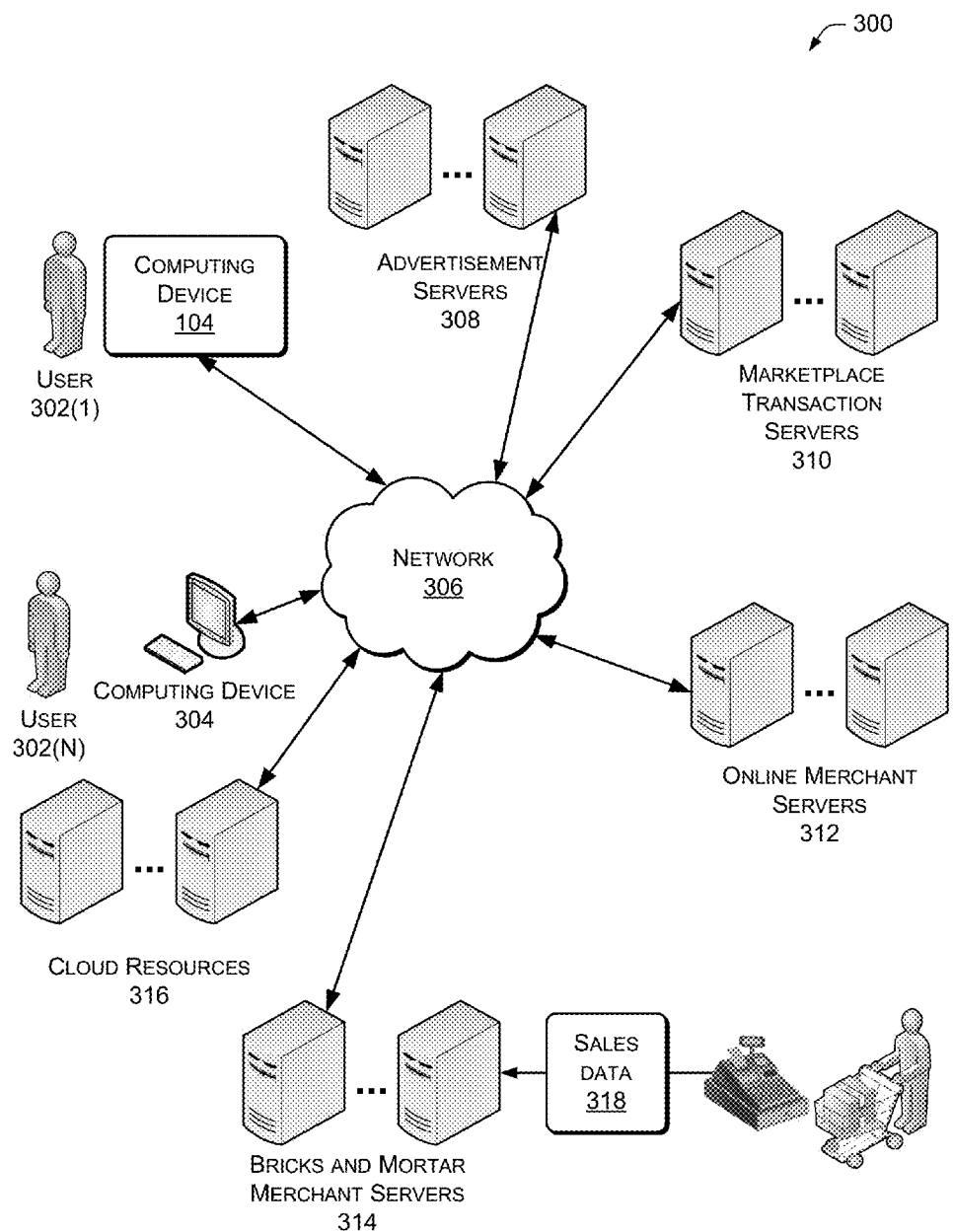
FIG. 3 illustrates an environment encompassing the computing device, users, advertisement servers, merchants, and so forth.

FIG. 3 illustrates an environment 300 encompassing the computing device, users, advertisement servers, merchants, and so forth. Users 302(1), 302(2), . . . 302(N) may use the computing device 104 in the augmented reality environment or other computing device 304, such as desktop computers, to access resources via a network 306. The network 306 may include the internet, private network, local area network, and so forth.

Resources available via the network 306 may include advertisement servers 308, marketplace transaction servers 310, online merchant servers 312, bricks and mortar merchant servers 314, cloud resources 316, and so forth. The advertisement servers 308 are configured to provide advertisements for presentation within the augmented reality environment. The marketplace transaction servers 310 facilitate transactions such as buying or selling objects. For example, the marketplace transaction servers 310 may provide a virtual marketplace allowing for users 302 to buy and sell used objects.

Online merchant servers 312 provide online storefronts and the ability to select and purchase objects. Bricks and mortar merchant servers 314 may be coupled with point of sale devices such as cash registers to provide sales data 318 to the augmented reality environment.

The computing device 104 may also access cloud resources 316 via the network 306. These cloud resources 316 may include additional storage, processing capabilities, application access, and so forth.

Figure 4:
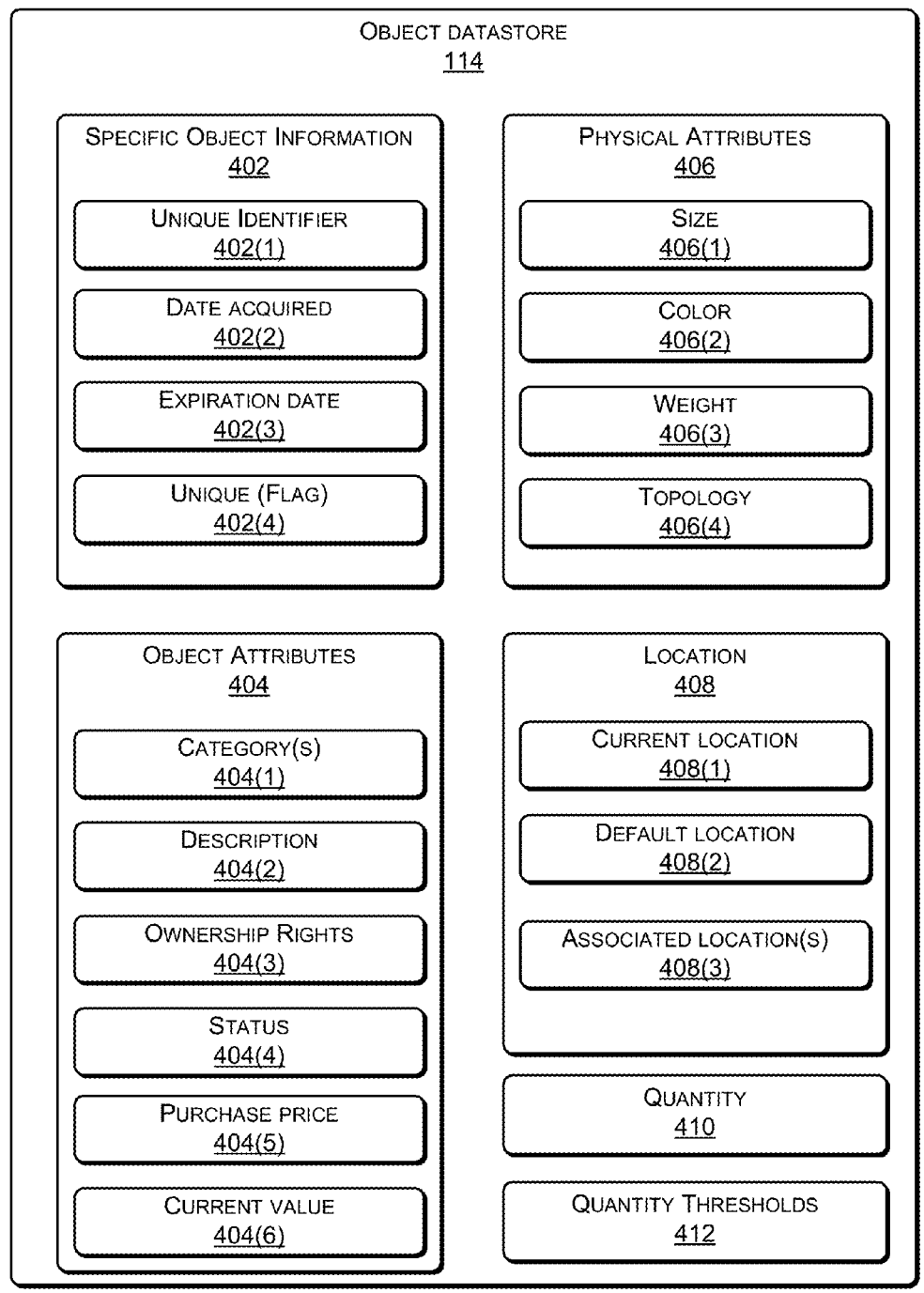
FIG. 4 is an illustrative diagram of an object datastore configured to store information about objects in the augmented reality environment.

FIG. 4 is an illustrative diagram of an object datastore 114 configured to store information about objects in the augmented reality environment. As described above, these objects may be tangible real world objects or virtual objects.

Information about the object may include specific object information 402 which describes a particular object. This may include a unique identifier 402(1), date acquired, 402(2), expiration date 402(3), uniqueness flag 402(4), and so forth. For example, the object information 402 may define that an object with serial number 12345 was acquired on Apr. 1, 2011, will expire on Apr. 1, 2013, and is a fungible non-unique item. Object attributes 404 may also be stored. These attributes may include one or more categories 404(1), description 404(2), ownership rights 404(3), status 404(4), purchase price 404(5), current value 404(6), and so forth. For example, the object 12345 may be in the categories 404(1) of food, canned, and fruit with a description 404(2) of stewed prunes.

The ownership rights 404(3) may indicate what property rights are held by a particular user or group of users. For example, ownership rights 404(3) may include possession but not ownership if the object is being leased or rented from another. Continuing the example, the ownership rights 404(3) may indicate that the user holds all property rights in the can of stewed prunes and the status 404(4) may indicate that the can has been partially consumed. A purchase price 404(5) of $1.95 may be recorded, and the current value of the remaining contents 404(6) may be $0.37.

Physical attributes 406 about the object may also be stored in the object datastore 114. The physical attributes 406 may include size/physical dimensions 406(1), color 406(2), weight 406(3), topology 406(4), and so forth. For example, the can of stewed prunes may be 300 mm tall and 50 mm in diameter, be predominately white, weigh 700 grams, and be generally cylindrical in shape.

Location 408 information about the object may also be maintained. This may include a current location 408(1), default location 408(2), associated locations 408(3), and so forth. Continuing the above example, the can of stewed prunes may be located on the second shelf of the refrigerator, but have a default location of the fourth shelf in the pantry. The stewed prunes may also be associated with locations such as the countertop, stove, and dining room. The location 408 may be specified as an absolute physical location within the augmented reality environment or a relative physical location. For example, an absolute physical location may be that the stewed prunes are located at coordinates 3400 mm, −975 mm, 65 mm in a Cartesian coordinate system describing the augmented reality environment encompassing the room. In contrast, an example of a relative physical location would be that the stewed prunes are located in the kitchen.

A quantity 410 of objects present in the augmented reality environment may also be stored. These quantities may be associated with particular locations 408, or maintained for the augmented reality environment as a whole. Quantity thresholds 412 may also be stored. For example, a user may specify that they prefer to have at least three cans of stewed prunes in stock but no more than five. The quantity thresholds 412 may also be specified by location. For example, the user may wish to have only a single can of stewed prunes in the refrigerator at a time. Maintaining data about the location, quantity, and so forth, allows the user to access this information to make choices or take actions within the environment which involve those objects.

Figure 5:
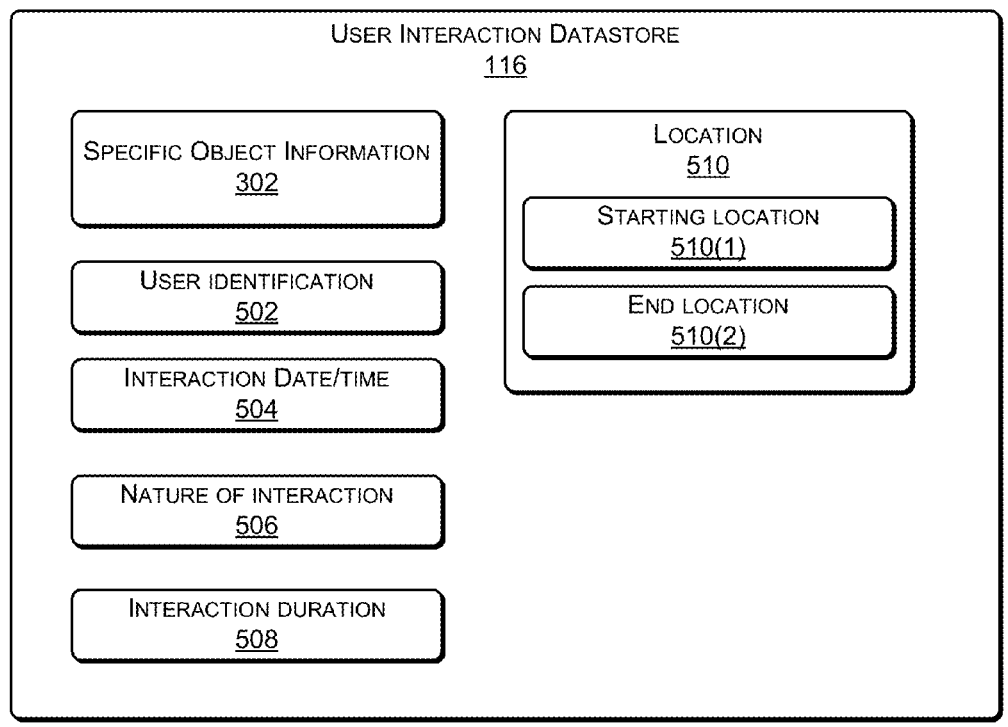
FIG. 5 is an illustrative diagram of a user interaction datastore configured to store information about how users interact with objects in the augmented reality environment.

FIG. 5 is an illustrative diagram of a user interaction datastore 116 configured to store information about how users interact with objects in the augmented reality environment. The datastore 116 may include the specific object information 402 to associate particular interactions with a particular object or group of objects.

A user identification 502 may be stored, indicating which user or users interacted with the object. For example, the user identification 502 may indicate that the user 302(1) interacted with the can of stewed prunes. The user interaction datastore 116 may also store a date/time 504 of the interaction, a nature of interaction 506, and a duration 508 of the interaction. Continuing the example, the date/time of interaction with the can of stewed prunes was on Apr. 1, 2011 at 8:37:10, the nature of the interaction was picking up the can, and the duration was 22 seconds.

The user interaction datastore 116 may also store location information 510 about the interaction. This location information may include a starting location 510(1), end location 510(2), and so forth. In our example, this may indicate that the starting location of the interaction with the canned prunes was the second shelf of the refrigerator and the end location was the kitchen counter.

Users or processes may query the user interaction datastore 116. For example, the user 302 may query to determine who last ate the stewed prunes, whether the prunes were put away, and so forth. In another example, the user 302 may query to determine the location for a misplaced set of car keys.

The user interaction datastore 116 may also be queried to generate a listing of objects which are frequently or infrequently used. For example, when the user 302 is preparing to move to a new apartment he may wish to dispose of unused and unwanted objects. The user 302 may query the user interaction datastore 116 to list all objects which users have not interacted with in the previous twelve months.

Figure 6:
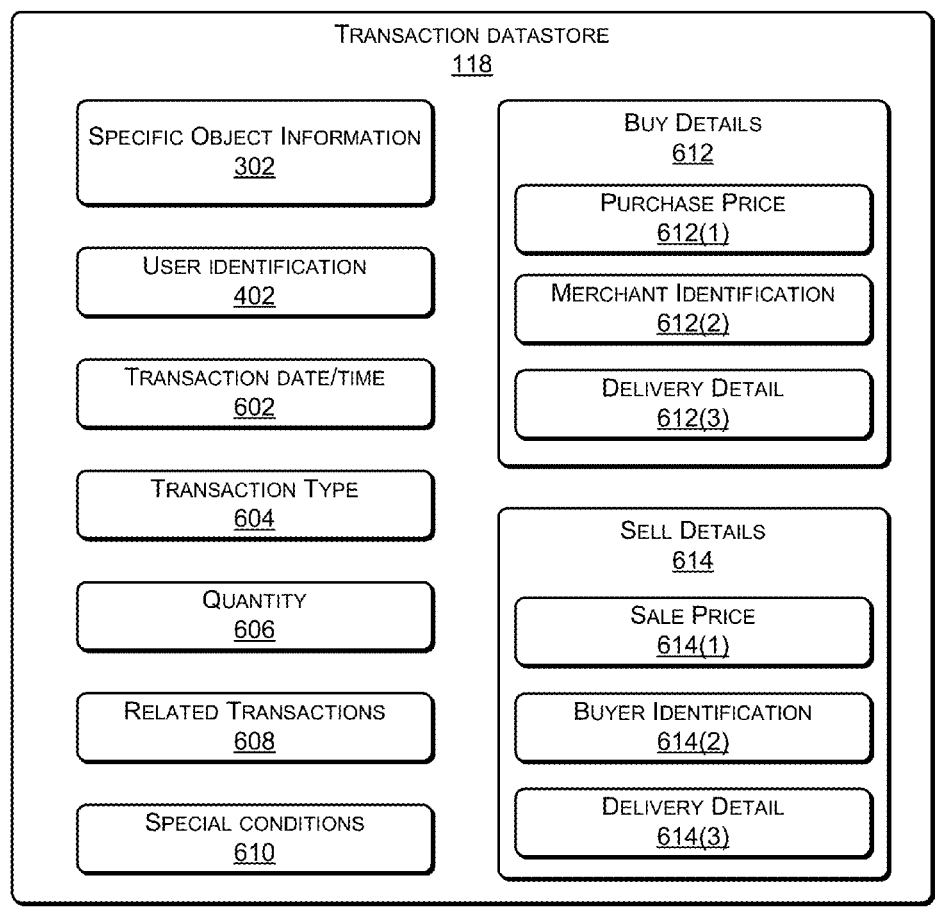
FIG. 6 is an illustrative diagram of a transaction datastore configured to store information about transactions involving objects in the augmented reality environment.

FIG. 6 is an illustrative diagram of a transaction datastore 118. The transaction datastore 118 is configured to store information about transactions involving objects in the augmented reality environment. The specific object information 402 and user identification 502 may be associated with transactional details such as transaction date/time 602, transaction type 604, quantity of the transaction 606, related transactions 608, special conditions of the transaction 610, buy details 612, sell details 614, and so forth.

When the transaction type 604 indicates the transaction involves a purchase of an object, the buy details 612 may be captured. This data may include purchase price 612(1), merchant identification 612(2), delivery details 612(3), and so forth.

In some situations, such as when the transaction type 604 indicates the transaction involves a sale, the sell details 614 may be populated. The details may include a sale price 614(1) indicating a sale price of the object, a buyer identification 614(2) indicating the identity of a buyer, delivery details 614(3) describing how the object is to be delivered, and other information.

Figure 7:
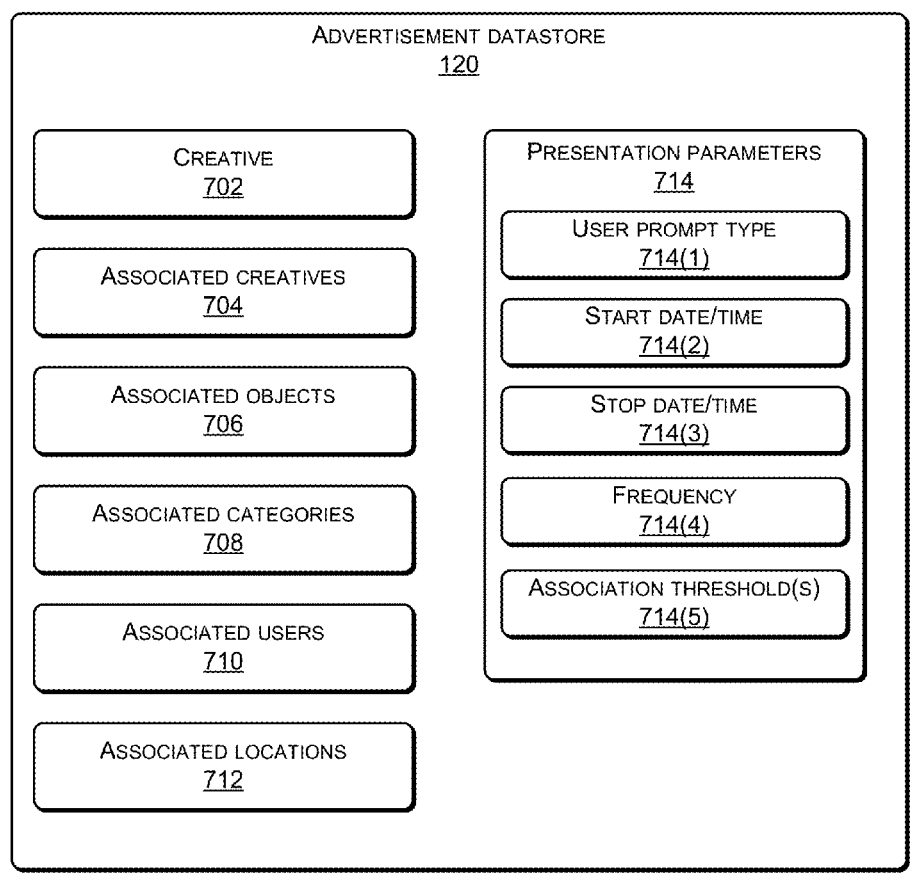
FIG. 7 is an illustrative diagram of an advertisement datastore configured to store information about advertisements associated with objects.

FIG. 7 is an illustrative diagram of an advertisement datastore 120 configured to store information about advertisements associated with objects. The advertisement comprises a creative 702 and other details such as found in the advertisement datastore 120. The creative 702 may comprise audio, video, text, image, or other media. The creative 702 in the datastore 120 may be a copy of an advertisement or may comprise a link or reference to another storage location. For example, the creative 702 may be a video clip describing the benefits of a virtual gym with personal trainers. Connections to or copies of associated creatives 704 may also be stored. For example, the creative 702 of the advertising personal training services may have associated creatives 704 pertaining to free weights, exercise clothing, diet services, and so forth.

Associated objects 706 describe what objects are associated with the advertisement. For example, a barbell may be associated with an advertisement for personal trainer services.

Associated categories 708 indicate what categories of objects are associated with the advertisement. For example, the object categories of exercise equipment, health and fitness, weight loss, and so forth may be associated with the advertisement for personal trainer services.

Advertisements may be associated with particular users or groups of users. Associated users 710 may be designated which are considered suitable for the particular creative 702. For example, the ad for personal trainer services may be associated with adult users, but not adolescents. Therefore, in this example, when the environment recognizes an adult has entered the room containing the barbell, an ad for personal trainer services may be presented. In contrast, when the environment recognizes a child has entered the room, an ad for eating healthy snacks may be presented instead.

The immersive nature of the augmented reality environment also provides opportunity for targeted location aware advertisements. Associated locations 712 indicate locations, absolute or relative, in which the advertisement 120 is considered relevant. For example, an advertisement for personal trainer services may be presented when the user is in a room with exercise equipment, but not when in the kitchen.

Presentation parameters 714 may also be stored. These parameters may include a user prompt type 714(1), start date/time 714(2), stop date/time 714(3), frequency 714(4), and association thresholds 714(5). The user prompt type 714(1) indicates whether the user prompt is a highlight of an object, full motion video projection, audio prompt, and so forth. The time when the creative 702 is presented may be specified with the start date/time 714(2), stop date/time 714(3) and frequency. For example, the creative 702 is to be presented at most five times between 16:00 and 20:00 every day.

The association threshold 714(5) indicates what level of involvement should exist between the user and the object before the creative is associated for presentation. The level of involvement may indicate a physical proximity or contact, such as an instruction for the system to associate the creative with the object when the user touches or approaches the object. Continuing the example above, the creative about the personal trainer service may be configured with the association threshold 714(5) set such that the ad is presented when the user reaches for the barbells, but not if the user faces them.

Figure 8:
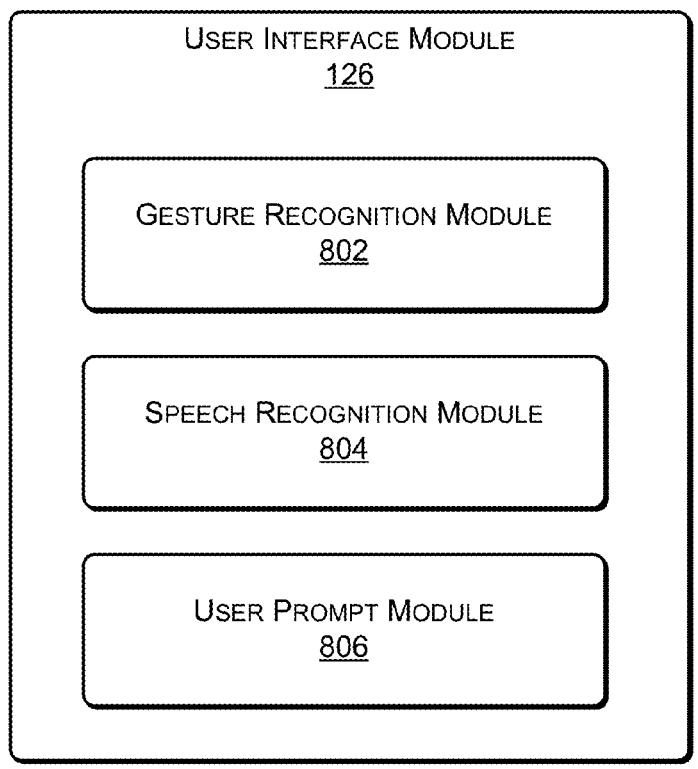
FIG. 8 is a schematic of a user interface module.

FIG. 8 is a schematic of a user interface module 126. As described above, the module 126 is configured to accept and interpret input and generate output for the user. The user interface module 126 may include a gesture recognition module 802 configured to recognize gestural input. A gesture is a sequence of motions made by the user or an object under the user's control within the augmented reality environment. These motions need not be in contact with a touch sensing input device. For example, a user may draw a finger in a particular pattern across the surface of a table or wall. The camera 210 may detect this motion and determine the motions of the user.

In some implementations, the gesture may occur at least in part free from contact with other objects. For example, the gesture may comprise the user extending a pointer finger and touching an object, or vice versa. The gesture need not, but may, call for contact. For example, the gesture may include the user waving a hand, pointing at an object, arranging their fingers in a particular configuration, and so forth.

Some gestures may also include audible elements, such as raising a hand and generating a finger snap, or rapping on a wall. Input may also include speech accepted by a speech recognition module 804. Other forms of input may also be accepted from input devices including keyboards, buttons, pointers, touch sensors, and so forth.

A user prompt module 806 in the user interface module 126 is configured to generate user prompts such as highlights, pointers, menus, icons, and so forth. For example, the user prompt module 806 may be configured to present a menu of options to the user. The user prompt module 806 may generate audible, visual, tactile, or other outputs.

Figure 9:
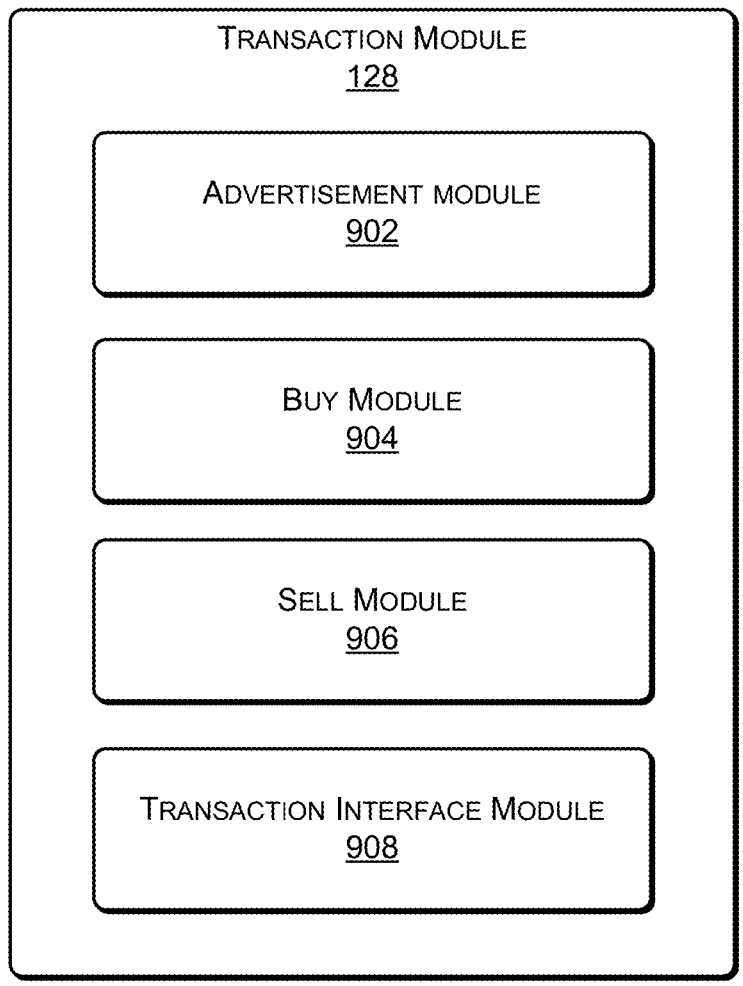
FIG. 9 is a schematic of a transaction module.

FIG. 9 is a schematic of a transaction module 128. An advertisement module 902 is configured to access data from the advertisement datastore 120 and associate objects in the augmented reality environment with advertisements. This association may be based upon the factors described above with regards to the advertisement datastore 120, such as the associated objects 706, associated categories 708, associated users 710, associated locations 712, and so forth.

A buy module 904 is configured to process user requests in the augmented reality environment to purchase objects. A sell module 906 is likewise configured to process user requests in the augmented reality environment to sell objects. These modules may access a transaction interface module 908 configured to provide transactional information to others such as merchants, other users, and so forth. For example, the advertisement module 902 may find an associated creative 702 and call the user interface module 806 to present the creative 702 to the user. A positive user response to the ad may result in the buy module 904 generating an order for the good or service presented in the ad. The transaction interface module 908 then provides the order to the appropriate supplier. An order acknowledgement may be received, and then presented to the user.

Illustrative Processes

Described next is an augmented reality environment within a room, such as may be generated with the ARFNs 102(1)-(N). Following the description of this environment, several example processes are provided with respect to this augmented reality environment.

Figure 10:
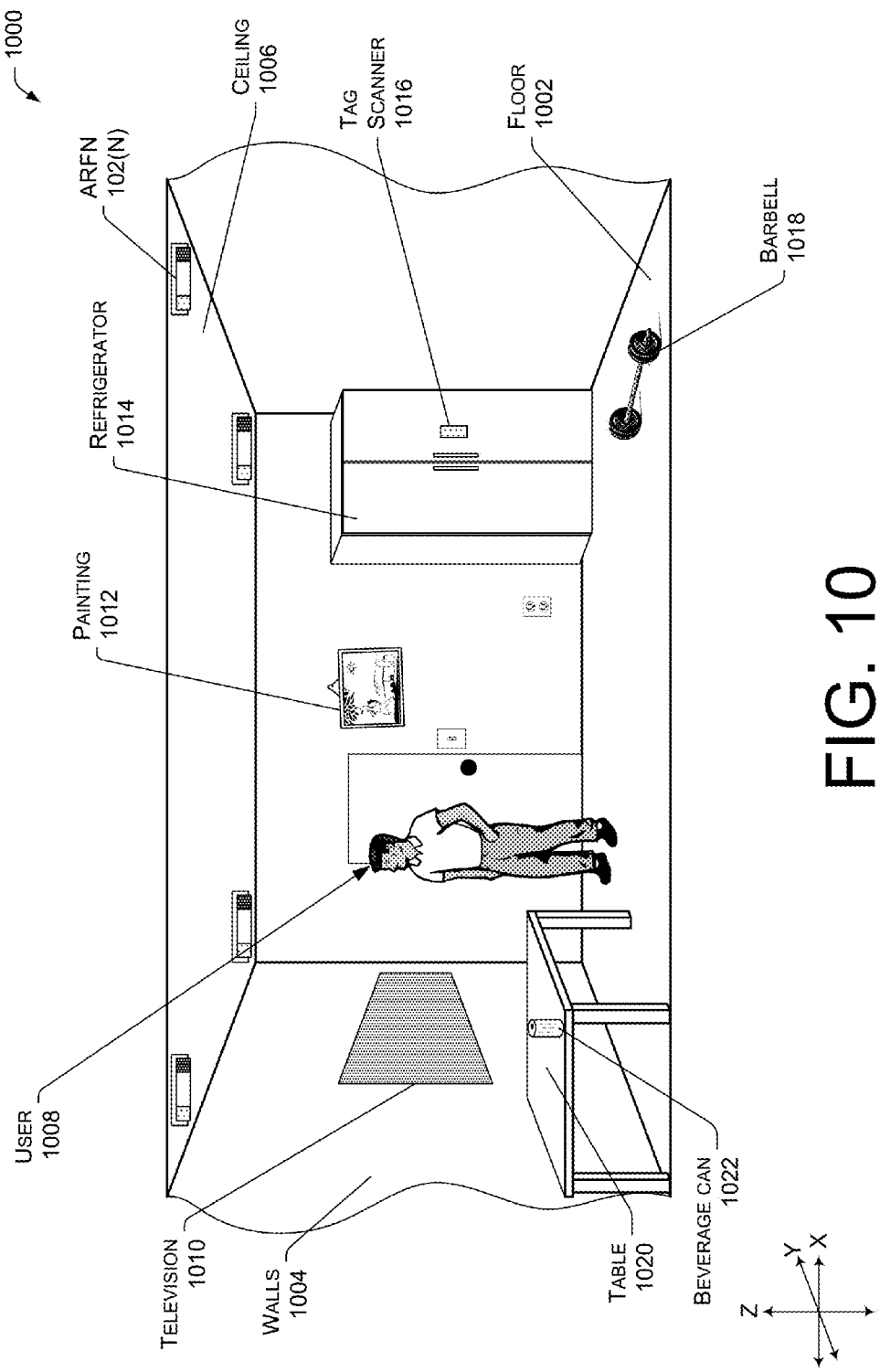
FIG. 10 is an illustrative augmented reality environment.

FIG. 10 is a detailed perspective view of an illustrative augmented reality environment 1000, such as may be maintained by the ARFNs 102(1)-(N). In this view a floor 1002, walls 1004, and ceiling 1006 of a room are shown. A user 1008 is standing on the floor 1002 of the room. While a single user 1008 is shown, it is understood that the augmented reality environment may support multiple users. Several ARFNs 102(1)-(N) are shown mounted on the ceiling 1006. While four ARFNs 102 are shown mounted in the approximate corners of the ceiling 1006, more or fewer ARFNs 102 may be used in other implementations, and such ARFNs may be distributed to other locations of the ceiling 1006, on the walls 1004, tables, and so forth.

Disposed on one of the walls 1004 is a television 1010 or computer display. This television/display 1010 may present at least a portion of the augmented reality environment. In some implementations the computer display may be a portable electronic device, such as a tablet computer. On a wall is a painting 1012, while a refrigerator 1014 sits in a corner.

The refrigerator 1014 may incorporate a tag scanner 1016. This scanner 1016 may be configured to read tags or labels of items placed into or removed from the refrigerator or another location. The tag scanner 1016 may comprise a barcode reader, radio frequency identification tag, camera, and so forth. In some implementations, the tag scanner 1016 may be a separate unit which is moveable within the augmented reality environment. Sitting in another corner of the room is a barbell 1018. In another corner is a table 1020 with a beverage can 1022 resting thereon.

Figure 11:
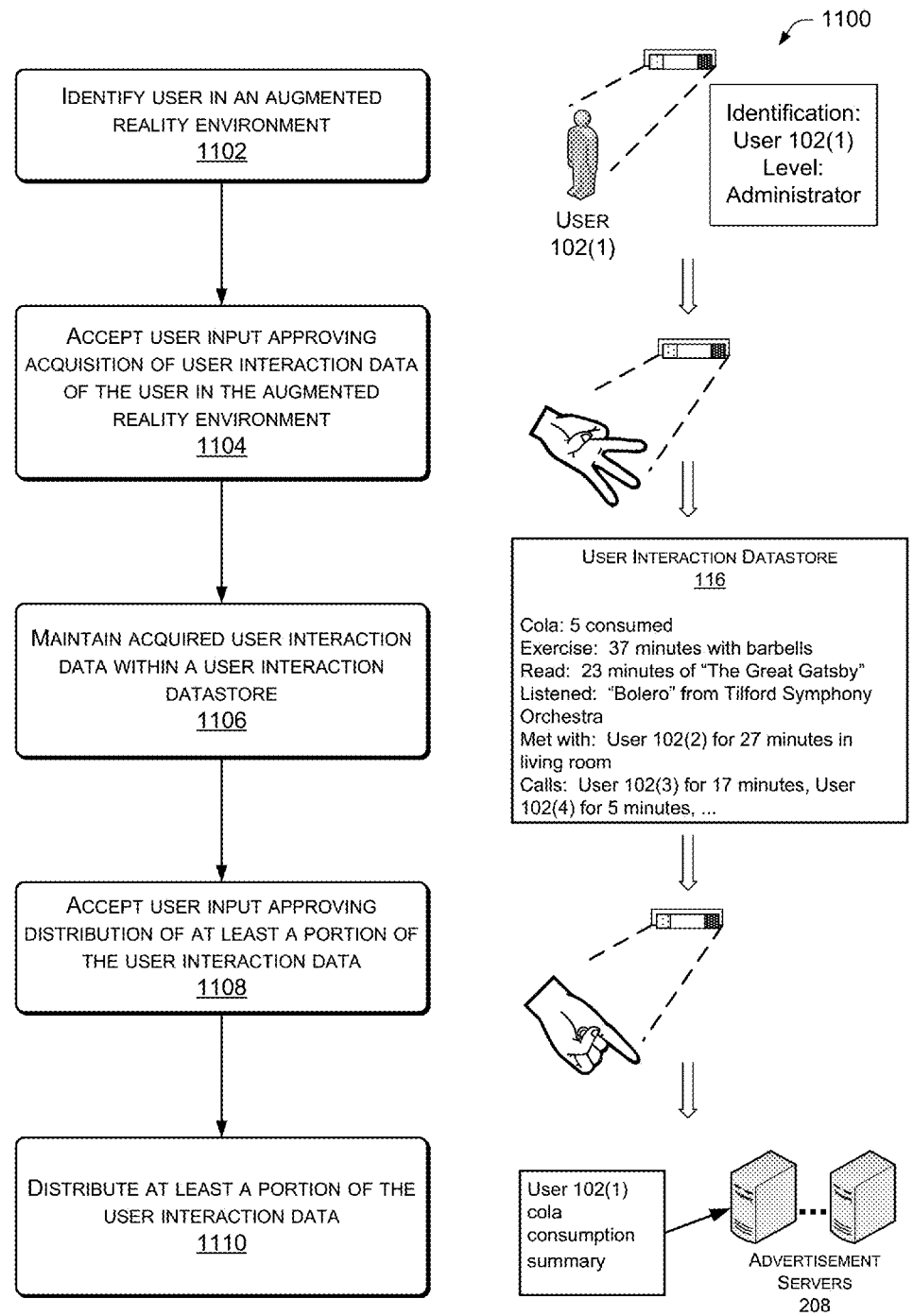
FIG. 11 is an illustrative process of tracking user interactions in the environment.

FIG. 11 is an illustrative process 1100 of tracking user interactions in an augment reality environment, such as the augmented reality environment 1000 described above. The processes described in this disclosure may be implemented by the architectures described herein, or by other architectures. These processes are illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes. It is understood that the following processes may be implemented on other architectures as well.

At 1102, a user is identified in an augmented reality environment. As described above, the tracking and control module 124 may perform the identification. This identification may be absolute or relative. As shown here, the augmented reality system may absolutely recognize a user as user 102(1), potentially with reference to the user identification 502 information described above. Also shown is a particular access level of "administrator" associated with the user 102(1). In comparison to absolute identification, a relative identification is that person A and person B are different individuals but with unknown identities.

At 1104, the user provides input approving acquisition of user interaction data in the augmented reality environment. In some implementations, this input may be via the projector 206 and the camera 210 of the ARFN 102 emitting and receiving, respectively, structured light and the tracking and control module 124 processing this input. For example, a user may make a gesture of the sign language "w" associated with a mnemonic to allow the ARFN 102 to "watch" what is happening in the augmented reality environment. The ability to approve acquisition of data may be limited to specific users or groups of users. For example, an adult user may have authority to approve acquisition of user data, while a child may not.

At 1106, acquired user interaction data is maintained within a user interaction datastore 116. For example, as shown here the user interaction datastore 116 has stored that user 102(1) for a specific period of time has consumed five colas, exercised, listened to some music, and otherwise interacted with various objects and functions in the augmented reality environment.

At 1108, user input is accepted which approves distribution of a least a portion of the interaction data from the user interaction datastore 116. For example, the user may make a gesture indicating that the augmented reality system is allowed to share cola consumption with an advertising company.

At 1110, at least a portion of the user interaction data from the user interaction datastore 116 is distributed to another party. For example, the computing device 104 then provides the cola consumption data to the advertisement servers 308 via the network 306. In some implementations, the transaction module 128 may perform the distribution.

Figure 12:
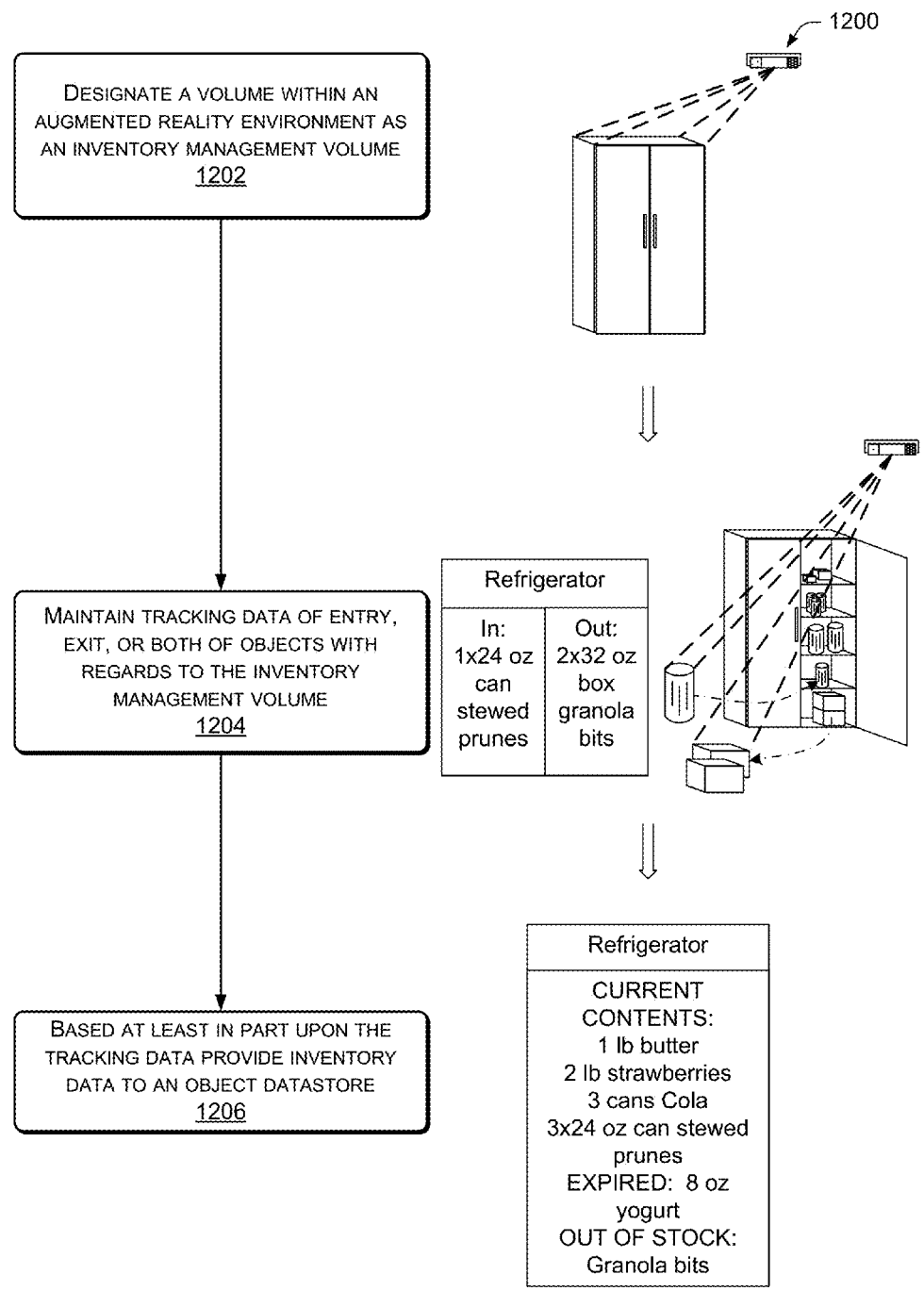
FIG. 12 is an illustrative process of inventory management in an augmented reality environment.

FIG. 12 is an illustrative process 1200 of inventory management in an augmented reality environment. Because the augmented reality environment may be configured to recognize objects as well as their locations, the augmented reality system is able to provide inventory tracking functions.

At 1202, a volume within the augmented reality environment is designated as an inventory management volume. This designation may be performed by the tracking and control module 124. For example, this may be a particular appliance such as a refrigerator, location such as a cupboard, room such as the kitchen, and so forth.

At 1204, tracking data comprising movement of objects with regard to the inventory management volume is maintained. For example, the user may place a can of stewed prunes into the refrigerator 1014 and remove two boxes of granola bits, updating the inventory of objects in the refrigerator 1014. Other details about the objects may be tracked as well, such as expiration dates, replacement periods, quantity used, and so forth. This tracking may be performed by the tracking and control module 124. In one implementation, the tag scanner 1016 may be used to provide tracking data of object movement.

At 1206, based at least in part upon the tracking data, inventory data may be provided to the object datastore 114. In this example, the object datastore 114 may be provided with the data that the stewed prunes are now in the refrigerator 1014 while the granola bits have been removed from the refrigerator 1014. The inventory of the refrigerator contents may then be adjusted to reflect that there are now three cans of stewed prunes and no granola bits.

Figure 13:
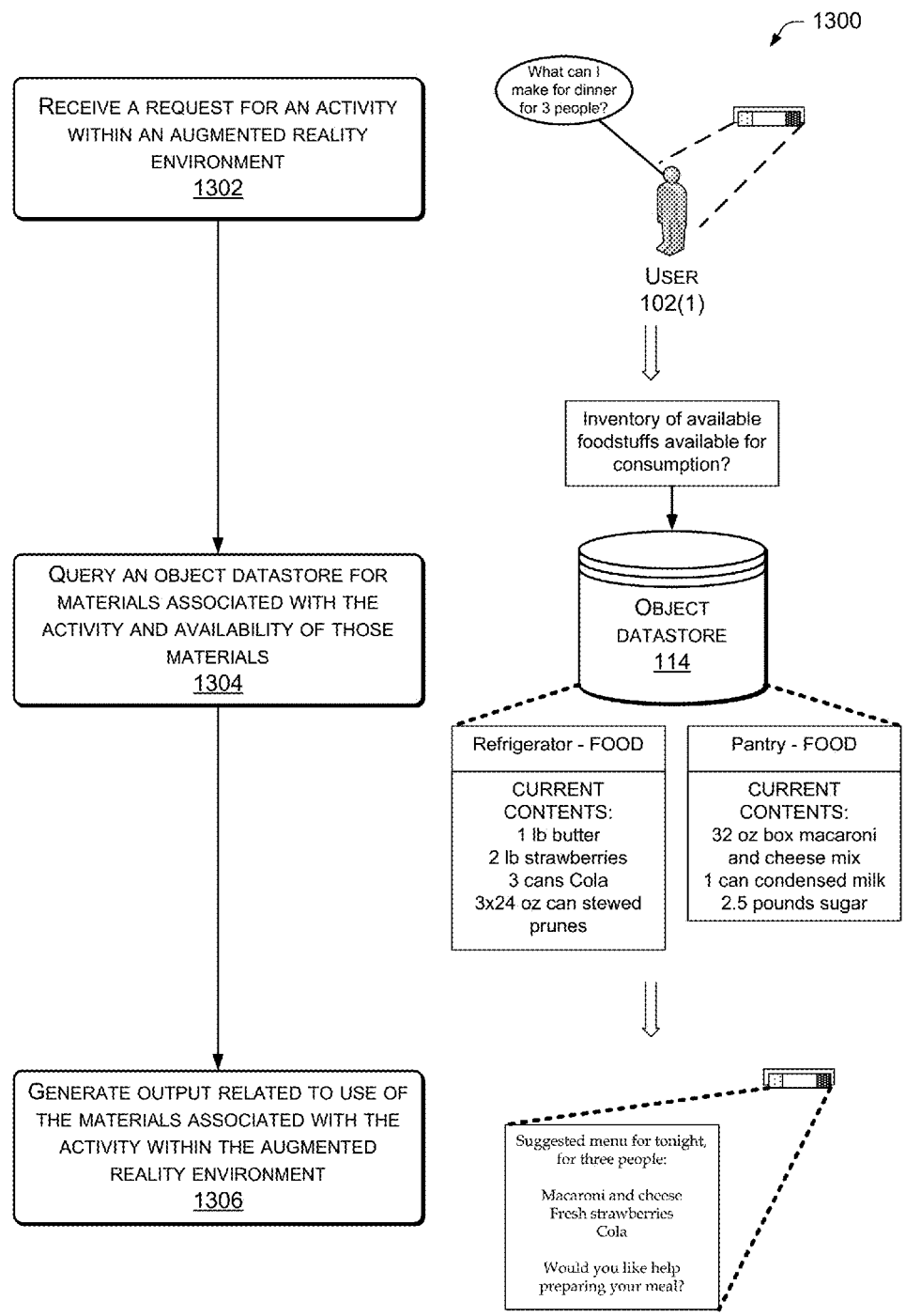
FIG. 13 is an illustrative process of assisting an activity in an augmented reality environment.

FIG. 13 is an illustrative process 1300 of assisting an activity in an augmented reality environment. At 1302, a request for an activity within the augmented reality environment 1000 is received, such as by the tracking and control module 124. Activities may include cooking, crafting, games, maintenance, repairs, procedures, and so forth. For example, when as shown here the augmented reality environment exists within a home the user may ask "what can I make for dinner for three people?"

At 1304, the object datastore 120 is queried for materials associated with the activity and availability of those materials. In some implementations, the tracking and control module 128 may generate the query. Continuing the example, an inventory of foodstuffs which are available for consumption in the object datastore 114 is compared to a recipe database accessed via the network 306. Where a list of the materials associated with the activity is not available, the system may prompt the user for the list.

At 1306, output related to use of the materials associated with the activity within the augmented reality environment 1000 is generated. As shown here, a suggested menu for tonight serving three people and using foodstuffs which are on hand is presented. Should the user request it, the augmented reality system may provide additional prompts and details as to where the necessary foodstuffs are located, details on how to prepare them, and so forth.

Figure 14:
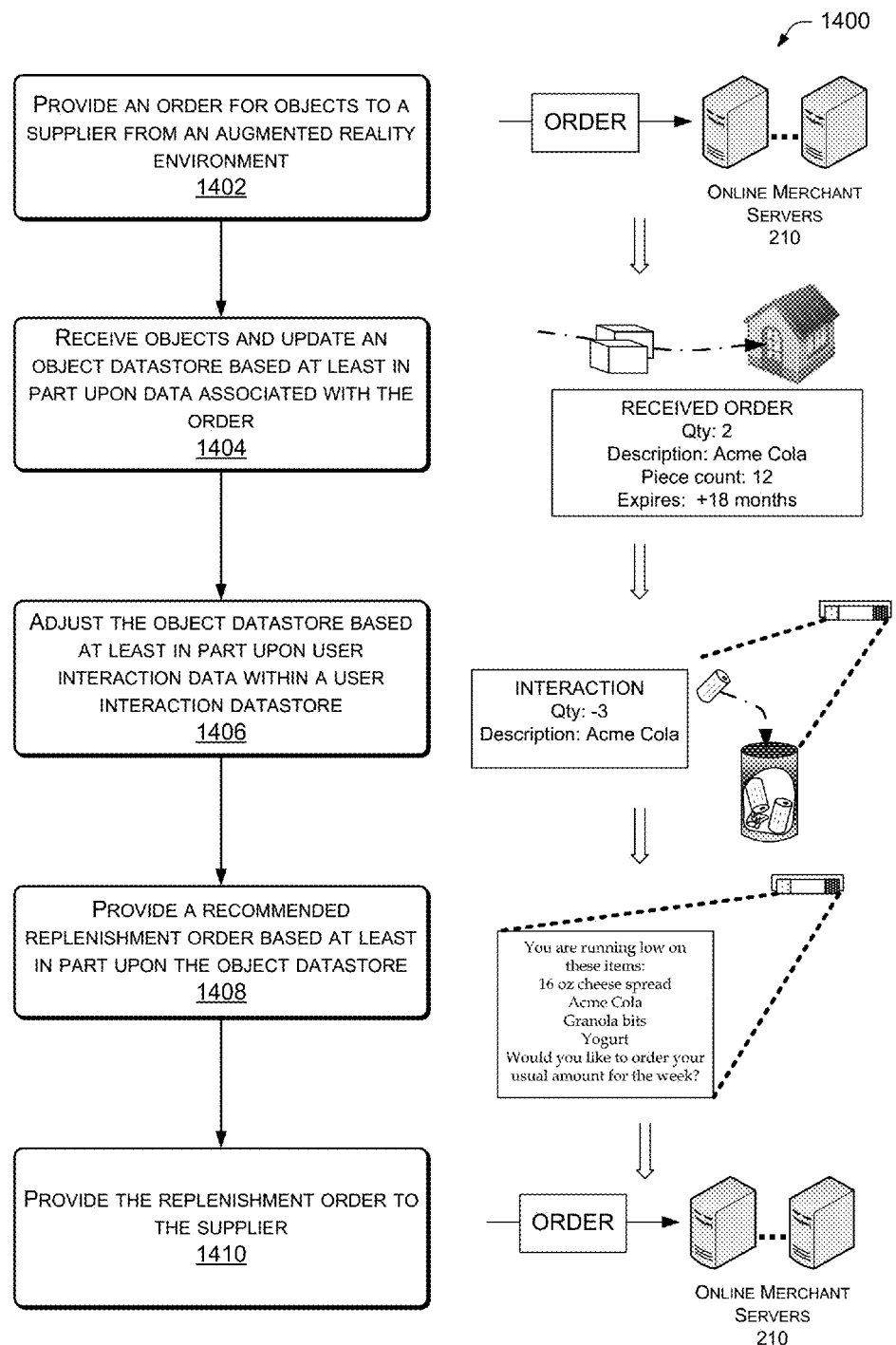
FIG. 14 is an illustrative process of receiving objects into an augmented reality environment and replenishing those objects.

FIG. 14 is an illustrative process 1400 of receiving objects into an augmented reality environment and replenishing those objects. Objects may be received from a variety of sources, such as deliveries from merchants. In such a situation, manifest data may be received from the merchant and used to receive objects into the augmented reality environment 1000. The transaction module 128 may act to receive the information from the merchant, while the tracking and control module 124 determines the physical arrival or movement of objects in the augmented reality environment.

At 1402, an order for objects to a supplier is provided from the augmented reality environment 1000. The transaction interface module 908 may communicate the order via the network 308 to the online merchant server 312. For example, an order may be placed with online merchant "Danube" for two cases of Acme Cola.

At 1404, objects are physically received at the augmented reality environment such as a user's home and an update is made to the object datastore 114 based at least in part upon data associated with the order. Continuing the example, the manifest for the shipment made by the online merchant "Danube" shows a quantity of two cases of Acme Cola. Upon confirmation of delivery at the customer, the object datastore 114 associated with the customer is updated to reflect the increase in inventory level of Acme Cola.

A delivery carrier may provide the confirmation of delivery, the augmented reality system may recognize the parcel containing the shipment, or a combination thereof may also be used. In one implementation, the manifest may encoded within the physical shipment in machine readable form. For example, a radio frequency identification tag may store the manifest. The tracking and control module 124 may then be configured to read this tag and process the information stored therein. In another implementation, the manifest may be transmitted from the supplier or shipper to the augmented reality system via the network 306.

At 1406, the object datastore 114 is adjusted based at least in part upon user interaction data within the user interaction datastore 116. For example, the user may place three cans of Acme Cola in a final location designated as a trash can. Following placement of the cans into the trash can, the inventory level of Acme Cola is decremented in the object datastore 114.

At 1408, a recommended replenishment order based at least in part upon the object datastore 114 information is provided. The quantity 410 on hand and the quantity thresholds 412 may be used to affect when the replenishment order is provided. Here, the user is shown a recommended order showing several items which are below pre-determined replenishment thresholds, such as Acme Cola and granola bits. These pre-determined replenishment thresholds may differ from object to object. For example, Acme Cola may have a replenishment threshold of twelve cans while granola bits may have a replenishment threshold of two packages.

The recommended replenishment order may include substitutions for objects, supplier, shipping/delivery method, and so forth. For example, the recommended replenishment order may suggest Coyote Cola rather than Acme Cola. Determination of what to substitute and whether to present this substitution to the user may be made based on parameters defined by the user, the system 100, a supplier, an advertiser, or a combination thereof. For example, the user may have set a user parameter calling for presentation of lower priced alternatives in replenishment orders. Thus, when Coyote Cola goes on sale it may be suggested within the replenishment order. In some implementations, the substitution may be made without presentation to the user.

At 1410, the replenishment order is provided to the supplier. For example, the transaction interface module 908 may connect via the network 308 to transmit the order to the online merchant servers 312 for the supplier "Danube."

A confirmatory prompt may be presented prior to providing the order to the supplier. For example, the user interface module 126 may be configured to present a listing of the order via the projector 206 on a wall in the user's line of sight. In another implementation, the replenishment order may be sent automatically. As shown here, the order including the Acme Cola is placed with the online merchant servers 310, as described above.

Figure 15:
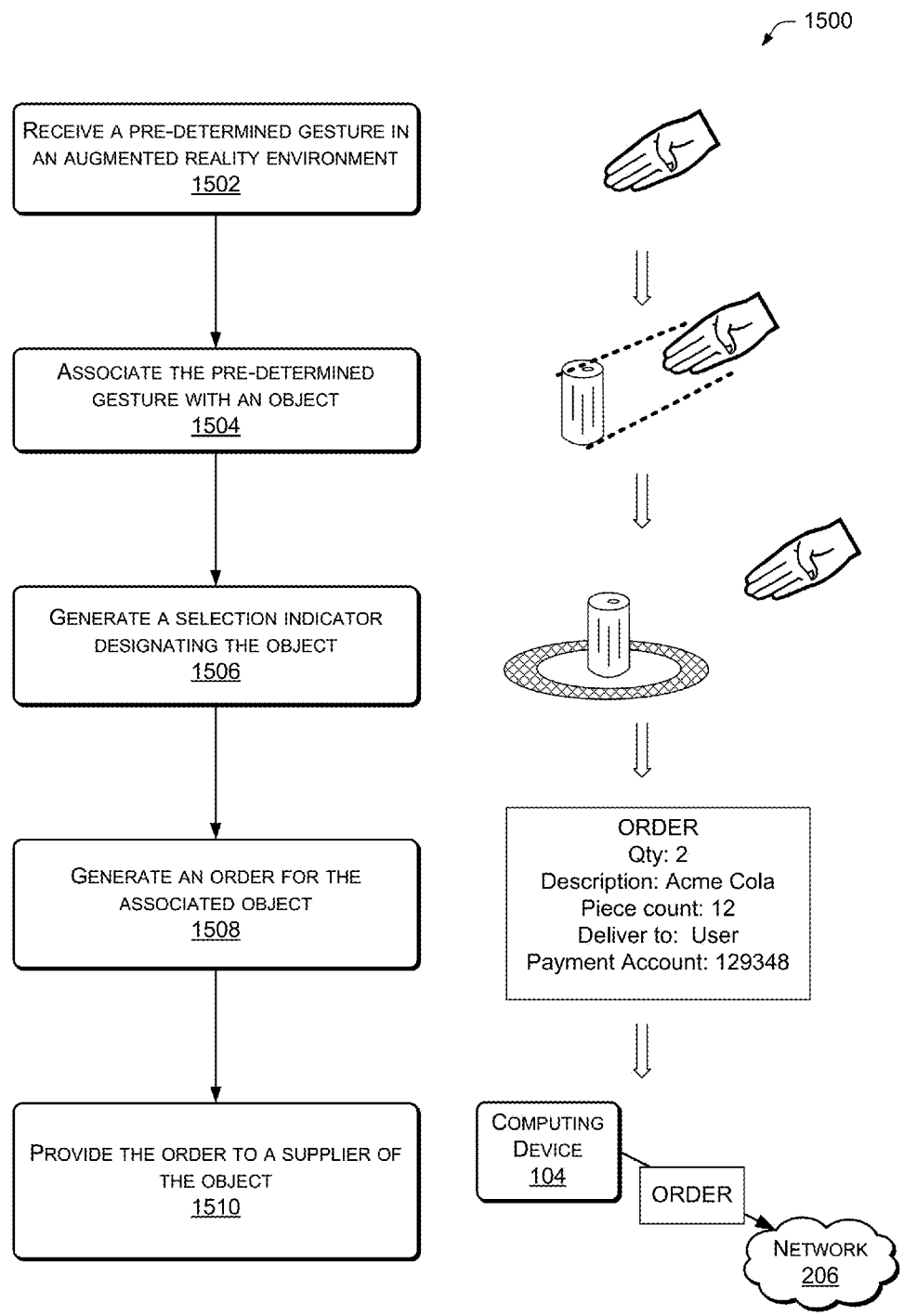
FIG. 15 is an illustrative process of initiating a purchase in an augmented reality environment.

FIG. 15 is an illustrative process 1500 of initiating a purchase in the augmented reality environment. The capability of the augmented reality system to receive gestures and other inputs of users allows for new mechanisms for initiating purchases. With the techniques and processes described herein, it becomes possible to purchase with a single touch of an object or a gesture having one or more motions which occur at least in part free from contact with other objects.

At 1502, a pre-determined gesture is received in an augmented reality environment. The pre-determined gesture may have a mnemonic connotation, such as the American Sign Language letter "b" for "buy." This gesture may comprise movements, speech, or a combination thereof.

At 1504, the pre-determined gesture is associated with an object in the augmented reality environment. For example, it may be an object the user's gesturing hand is pointed to, or an object which the user is holding, touching, or within a pre-determined distance of. As described above, these objects may be tangible real world objects or virtual objects. Tangible objects include items such as tables, chairs, people, pets, food containers, printed books, and so forth. Virtual objects include media content such as songs, movies, electronic books, computer generated scenes, and so forth. As described above, the object itself may be categorized as a unitary item, package, group of closely interrelated objects, container, and so forth.

As also described above, the category of object used may be determined at least in part by factors including context, prior use, pre-determined data, and so forth. For example, as shown here where the single can of Cola is sitting on a table, in the context of generating an order the selected object is a package object. In contrast, in the context of the user requesting nutritional information about the Cola the nutritional information about the number of calories in a single can is presented rather than the number of calories in the entire package.

In another implementation, the user may issue a pre-determined gesture or other command to designate the category of the object. For example, a user may point to a package of Cola then issue a gesture indicating the number "1" which the system may then interpret as meaning select from the Cola a single can.

Association with the object may be dependent upon the context of the interaction. For example, suppose the user is watching a broadcast show on the television 1010. During a commercial break in the broadcast show, an advertisement for a particular song is presented on the television 1010. The user may point to the screen and make the pre-determined gesture. Within the environmental context at the time of that gesture, the augmented reality system determines that the user is not intending to purchase another television set 1010, but rather is attempting to buy the particular song being advertised on the television 1010 at the time of the gesture.

At 1506, a selection indicator designating the object is generated. This selection indicator may comprise a visual indicator proximate to or overlapping the associated object. For example, a ring, arrow, overlay, audible prompt and so forth may be used to indicate the associated object. In other implementations, audible prompts may also be used in conjunction with the visible prompts. These audible indicators may be configured to have an apparent source proximate to the associated object. For example, an audible prompt may be perceived by the user to come from (or nearby) the object.

The selection indicator may have several attributes such as size, brightness, color, intensity, shape, image, audio waveform, and so forth. One or more of these attributes may be modified according to characteristics of the object. For example, the one or more attributes of the selection indicator may be modified in proportion to the purchase price 612 of the associated object. Thus, an inexpensive item may have a pale green selection indicator while an expensive item may have a bright red selection indicator. Or the selection indicator may have one ring around the object for every ten dollars (rounded upwards) of purchase price, thus a seven dollar object would have a single ring and a thirty-nine dollar object would have four rings.

The selection indicator designating the object may also be modified based at least in part upon local availability. For example, when the available inventory as maintained in the object datastore 114 indicates that the associated object such as the Acme Cola is available in the home, the selection indicator may change shape, or include a trail of arrows pointing to the physical location where the extra Acme Cola is stored in the pantry.

In some implementations, a set of possible suppliers may be determined and presented to the user. For example, the selection indicator may include icons or trademarks associated with suppliers which provide that object. As a result, the user may see the selection indicator ring and disposed around that ring are icons for store "A", store "B" and store "C". The user may then point to the particular supplier he wants to order from. In some implementations, a particular gesture or portion of a gesture may be associated with a particular supplier.

At 1508, an order for the associated object is generated. A quantity of the order may be set to a default, or be adjusted based upon the gesture. A gesture indicating a numerical quantity or a magnitude of the pre-determined gesture may be used. For example, a "b" hand sign with a short arc may indicate buy a quantity of one, while a longer arc may indicate a quantity of two. In another implementation, the quantity may be dynamically adjusted after comparison to the quantity 410 and the quantity thresholds 412 in the object datastore 114. Thus, a pre-determined gesture to buy may trigger an order for a quantity necessary to replenish the inventory of the object up to a maximum quantity threshold. At least a portion of the order may be stored in the transaction datastore 118.

The system may identify a user issuing the pre-determined gesture and determine an authorization level of the user. The ability to generate an order may be limited to particular users or groups of users. The user may be identified by the augmented reality system and assigned order rights. These order rights may be restricted to particular categories of item, price limits, and so forth. For example, authorized adults may be able to purchase anything, while children may be limited to purchasing only school-related objects.

In some implementations, the user may be authorized for the purchase before the order for the associated object is generated. Orders from one or more unauthorized users may also be queued for confirmation by an authorized user. For example, orders initiated by a child or houseguest may be held in a queue for a parent to review.

In some implementations, prior to generating the order for the associated object, alterative options or substitutions may be presented to the user for selection. These substitutions may include alternative or comparable objects, suppliers, shipping/delivery methods, and so forth. The user may be presented with options to substitute Acme Cola with Birch Cola, purchase a 24 pack instead of a twelve pack, and so forth.

At 1510, the order is provided to a supplier of the object. The supplier may be another user, a commercial merchant, and so forth. The order or a portion thereof may be provided from the computing device 104 via the network 306 to the supplier. In some implementations, a plurality of orders may be queued for a pre-determined period prior to providing the orders to the supplier. For example, orders may be queued for four hours prior to providing the orders to the merchant to minimize loads on the merchant servers and encourage order consolidation. In other implementations, the queued orders may be consolidated into a single order.

Figure 16:
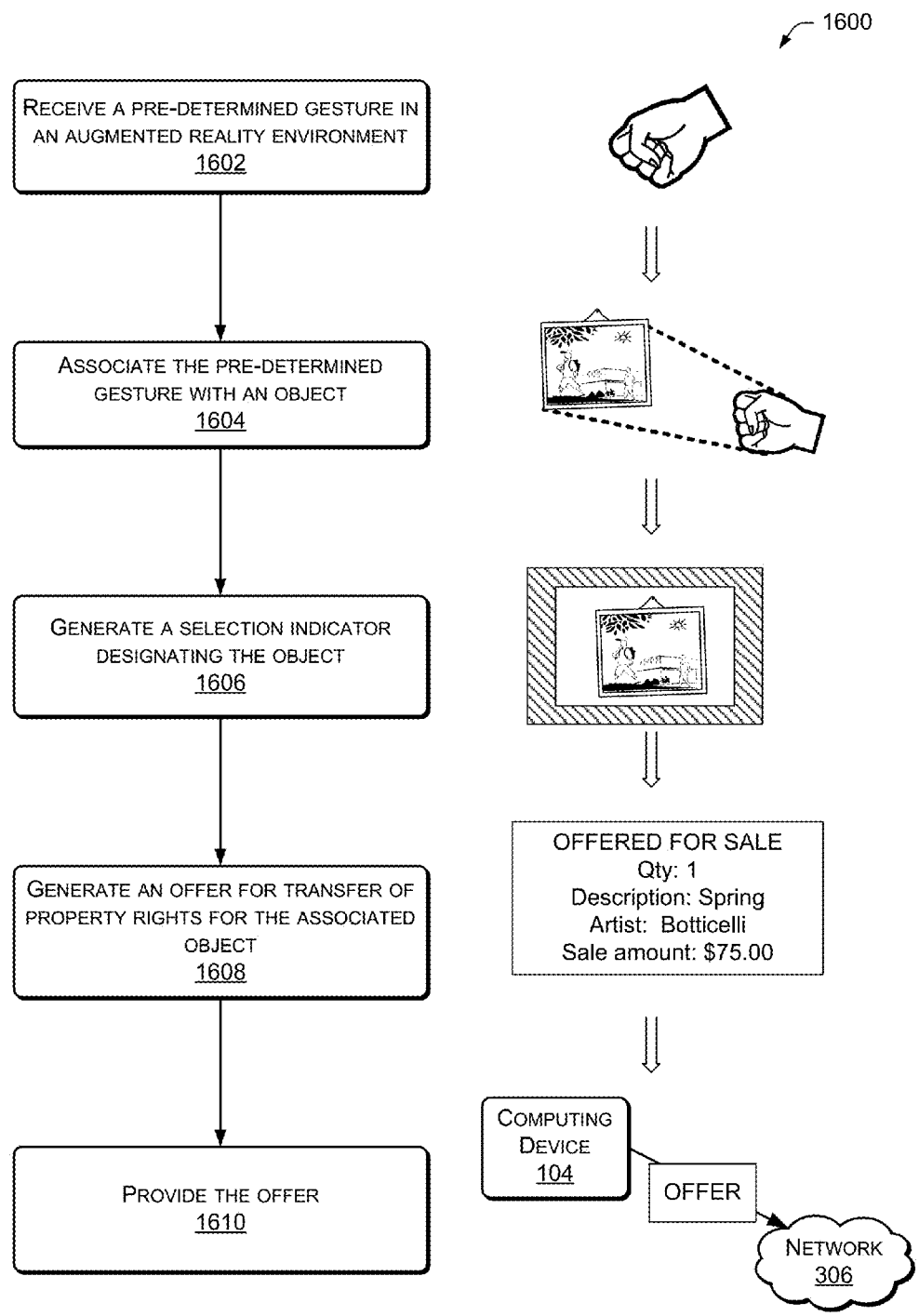
FIG. 16 is an illustrative process of initiating an offer for transfer of property rights in an augmented reality environment.

FIG. 16 is an illustrative process 1600 of initiating an offer for transfer of property rights in an augmented reality environment. The transfer of property rights may include a gift, donation, sale, lease, rental, creation of a lien, creation of a mortgage, and so forth for a particular object. As mentioned above, the object may be a physical object or a digital object.

At 1602, a pre-determined gesture is received in an augmented reality environment. As described above, the pre-determined gesture may have a mnemonic connotation, such as the American Sign Language letter "s" for "sell." This gesture may comprise movements, speech, or a combination thereof.

At 1604, the pre-determined gesture is associated with an object in the augmented reality environment. For example, it may be an object the user's gesturing hand is pointed to, such as the painting 1012 shown here. In other implementations the gesture may be associated to an object which the user is holding, touching, or within a pre-determined distance of. As described above, these objects may be tangible real world objects or virtual objects. Tangible objects include items such as tables, chairs, food containers, printed books, and so forth. Virtual objects include media content such as songs, movies, electronic books, computer-generated scenes, and so forth. Association with the object may be dependent upon the context of the interaction.

As described above, in some implementations the system 100 may provide a recommendation of what objects to offer. In such an implementation, the user gesture may initiate a query of the user interaction datastore 116 as described above for objects. The user may select query parameters, such as the period of time unused, maximum value, size of the object, and so forth. Data about gesture itself may also be used to set a query parameter. For example, a user may make very wide hand gestures indicating the entire premises, in which case the query would include objects throughout the accessible physical volume. The object(s) selected by the query may then be associated with the gesture.

At 1606, a selection indicator designating the object is generated. This selection indicator may comprise a visual indicator proximate to or overlapping the associated object. For example, a ring, arrow, overlay, audible prompt and so forth may be used to indicate the associated object. As shown here, a border is projected around the painting 1012 on the wall.

As described above with regards to FIG. 15, the selection indicator may have several attributes such as size, brightness, color, intensity, and so forth. One or more of these attributes may be modified according to characteristics of the object. In some implementations, one or more attributes of the selection indicator may be modifies in proportion to the offered sale price of the associated object.

The selection indicator attributes may also be modified to indicate when the local availability of the associated object exceeds a pre-determined threshold. For example, where the object datastore 114 indicates the user has twenty-five identical objects and the user has a pre-determined threshold of keeping at least five, the selection indicator may be green indicating the user has plenty to sell. However, should the object datastore 114 indicate that only five objects are in stock, the selection indicator may turn red indicating the user will be going below the pre-determined threshold should the sale proceed.

The attributes of the selection indicator may also be modified in proportion to a proposed purchase price of the associated object. For example, where the associated object is contemporaneously listed as being wanted by someone else, the proposed purchase price may affect the selection indicator.

At 1608, an offer for the transfer of property rights for the associated object is generated. Property rights of the object may be determined, as well as property rights of the object relative to a particular user. For example, the sell module 906 of the transaction module 128 may access the ownership rights 404(3) in the object datastore 114 to determine if the object can be sold and, if so, whether ownership rights allow a particular user to sell the object. This prevents a user from conveying property rights in an object which they may not have. As shown here, an offer has been generated for the painting 1012 indicating the quantity, description, artist, and sale amount.

Prior to generating the offer, the identity of the user issuing the pre-determined gesture may be determined as well as an authorization level associated with the user. For example, a child may not be authorized to sell an appliance in the house.

An appraisal may also be generated. This appraisal comprises an estimate or projection of a value associated with a transfer of one or more property interests associated with an object. For example, the system 100 may be configured to provide an assessment of the value of the selected painting 1012. The user may then use this appraised value to set the offer price for the painting 1012. This appraisal may be dependent upon the property rights transferred. Continuing the example, an appraisal of an offer price for sale may be different from an appraisal for a six-month rental.

At 1610, the offer is provided via the network 306 to another party, merchant, marketplace, and so forth. In other implementations, an image of the associated object may be acquired by the ARFN 102 and included in the offer. Other data may also be provided in the offer, including the date acquired 402(2), the purchase price 404(5), and so forth. As described above, offers from one or more unauthorized users may be queued for confirmation by an authorized user before providing them to another party.

In some implementations, shipping materials are provided to the user 302. The marketplace, a shipping company, and so forth may provide the shipping materials. The shipping materials may be provided when the offer is made or after acceptance of the offer. Shipping materials include shipping containers, boxes, padding, shipping labels, and so forth. For example, the sell module 906 may be configured to order shipping materials for delivery to the user 302.

Figure 17:
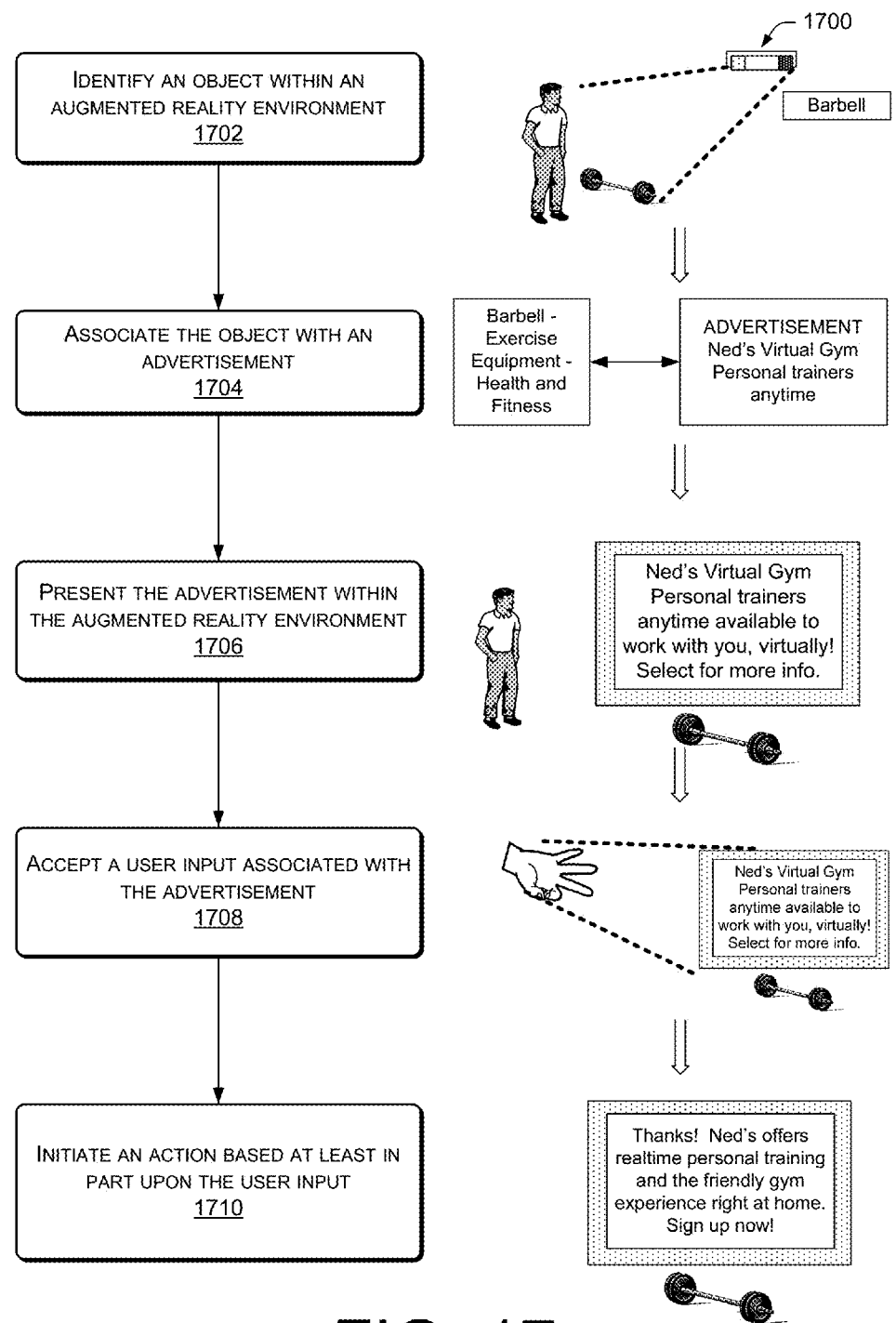
FIG. 17 is an illustrative process of presenting advertisements in an augmented reality environment.

FIG. 17 is an illustrative process 1700 of presenting advertisements or other notifications in an augmented reality environment. At 1702, an object within an augmented reality environment is identified. For example, as shown here the augmented reality system has identified the barbell. In some implementations, attention of a user with regards to the object may also be considered when determining which object is to be identified in the environment for presentation of an advertisement. Attention may be determined by analyzing position and activity of a user in relation to the object. For example, a user touching the object, standing adjacent to the object, gesturing towards the object, and so forth may indicate the attention of the user is on that object. Thus the augmented reality system may determine that the attention of the user is directed to the barbell because he is standing next to and facing the barbell.

At 1704, the identified object is associated with an advertisement. In some implementations, this may involve a query of the advertisement datastore 120 to determine what, if any, creatives 702 are associated with that object. Association may be based in some implementations on a comparison of the object's category 404(1) and the associated categories 708 of the advertisement. Continuing our example, the barbell's and ad for "Ned's Virtual Gym" share the category of "exercise equipment."

In some implementations, association of the object with an advertisement may also be dependent upon identity of the user or a group of users. For example, adults may receive the ad for "Ned's" while children may see a public service announcement for eating healthy snacks.

At 1706, the advertisement is presented within the augmented reality environment. This presentation may include audible, visual, or tactile outputs by the augmented reality system. As shown here, the creative 702 is presented on the wall adjacent to the barbell. The user interface module 126 may be configured such that the presentation of the advertisement is made relative to the positioning of the user interacting with the object. For example, as shown here the creative 702 is presented on the wall within the line of sight of the user, and not presented on the television 1010 behind him. In some implementations the advertisement may track with the user. For example, if the advertisement involves Cola, the advertisement may track so that it remains within the line of sight of the user while he is walking through rooms in the augmented reality environment 1000.

The presentation of the advertisement may also be limited based at least in part upon an identity or characteristics of one or more users within the augmented reality environment. For example, an adult female may not be presented with advertisements for men's suits. Or certain advertisements may be limited to presentation when children are present, such as for a toy.

The augmented reality system may be configured to cease presentation of the advertisement associated with the object when the user is interacting with another object. For example, the user may turn away from the barbell and get something out of the refrigerator. Upon turning away, the ad for "Ned's" may fade or disappear. However, another advertisement for something associated with the refrigerator may then appear.

At 1708, a user input associated with the advertisement is accepted. As above, this input may comprise audible signals, gestures, or a combination thereof. For example, as shown here the user is using a hand gesture indicating acceptance.

At 1710, an action is initiated based at least in part upon the user input. These actions may include acknowledging the ad and requesting further action such as initiating a purchase of goods and services, accepting or declining the ad with various intensities, and so forth. As shown here, the user's earlier acceptance action has prompted an action whereby the augmented reality environment has indicated acceptance of the advertisement and is providing additional information to the user on "Ned's" services with an option to sign up.

The particular gesture, or the magnitude thereof, may be used to indicate difference intensities of response. For example, a user may be slightly interested but not wish to view the ad at this particular time. A negative gesture with minimal motion may indicate that the intensity of response is low, and thus the ad is to be presented at a later time. A negative gesture made with large motions may indicate a high intensity of response and either increase the temporal delay in presenting the advertisement again, or cause the ad to be removed from presentation to this particular user permanently. These interaction details may be stored within the user interaction datastore 116, as described above.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. An augmented reality system comprising:
   a processor;
   a projector coupled to the processor and configured to generate structured light within an environment;
   a camera coupled to the processor and configured to receive at least a portion of structured light that has been reflected off one or more objects in the environment;
   memory; and
   one or more computer-executable instructions that are stored in the memory and that are executable by the processor to:
      identify a user in the environment at least partly with use of the structured light reflected off the one or more objects;
      identify, at least partly with use of the structured light reflected off the one or more objects, a pre-determined gesture directed toward an object of the one or more objects and generated at least in part by the user, wherein the object is a physical object located within the environment;
      determine, based at least in part on the structured light reflected off the one or more objects, a category of the object indicating whether the object is a unitary object or is part of a set of the one or more objects;
      associate the pre-determined gesture with the object based at least in part on the category of the object;
      generate a selection indicator with the projector to visually indicate the object, wherein the selection indicator includes one or more supplier indicators for at least one potential supplier of the object;
      cause the projector to display, within the environment, the selection indicator proximate to or overlapping the object;
      receive, based at least in part on a gesture, a selection of a supplier from the at least one potential supplier; and
      generate an order for a quantity of the object, wherein the quantity of the object is based, at least in part, on the category of the object.

2. The system of claim 1, wherein the pre-determined gesture comprises one or more motions of the user that occur at least partly in space free from contact with other objects within a pre-determined period of time.

3. The system of claim 1, wherein the selection indicator further includes one or more attributes that include at least one of size, brightness, color, or intensity, wherein the one or more attributes are modified in proportion to a purchase price of the object, and wherein the one or more computer-executable instructions are further executable by the processor to provide the order to the supplier of the object.

4. The system of claim 1, wherein the one or more computer-executable instructions are further executable by the processor to store at least a portion of the order in a transaction data store.

5. The system of claim 1, wherein the one or more computer-executable instructions are further executable by the processor to:
   determine a first authorization level associated with the user that indicates an ordering restriction based at least in part on at least one of one or more object categories or one or more price limits;
   determine, based at least in part on the first authorization level, that the user is authorized to generate the order but is not authorized to generate a second order;
   queue the second order for a second object;
   determine a second authorization level associated with a second user; and
   generate the second order based at least in part on the second authorization level indicating that the second user is authorized to generate the second order.

6. The system of claim 1, wherein the computer-executable instructions are further executable by the processor to determine, at least partly with use of the structured light reflected off the one or more objects, a state of the one or more objects in the environment substantially simultaneous with a time of the pre-determined gesture.

7. The system of claim 6, wherein the computer-executable instructions are further executable by the processor to associate the pre-determined gesture with the object based at least in part on:
   receiving an indication of the state of the one or more objects in the environment; and
   determining, based at least in part on the indication, the object of the one or more objects in the environment to associate with the pre-determined gesture.

8. The system of claim 1, wherein the one or more computer-executable instructions are further executable by the processor to determine the category of the object based at least in part on one of an environmental context of the object, a prior use of the object, or a pre-determined category associated with the object.

9. One or more non-transitory computer-readable storage media storing computer-executable instructions that, when executed, cause one or more processors to perform acts comprising:

receiving, from a sensor associated with a computing device, an image of an environment;

identifying, from the image, a gesture directed toward an object within the environment and occurring at least in part free from contact with the object and other objects within the environment, wherein the object is a physical object within the environment;

determining, from the image, an environmental context of the object substantially simultaneously with identifying the gesture; and at least partly in response to the identifying of the gesture and at least partly in response to the determining the environmental context of the object:

associating the gesture with the object;

generating a selection indicator for presentation within the environment designating the object, the selection indicator including one or more supplier indicators for potential suppliers of the object;

causing a projector to display the selection indicator proximate to and extending around a perimeter of the object within the environment;

determining, based at least in part on the gesture and a category of the object, a quantity of an order for one or more additional instances of the object;

receiving, based at least in part on a second gesture, a selection of a supplier from the potential suppliers; and generating the order for the one or more additional instances of the object.

10. The one or more non-transitory computer-readable storage media of claim 9, wherein one or more attributes of the selection indicator are in proportion to a purchase price of the object.

11. The one or more non-transitory computer-readable storage media of claim 10, wherein the one or more attributes of the selection indicator comprise at least one of size, brightness, color, or intensity.

12. The one or more non-transitory computer-readable storage media of claim 9, wherein the acts further comprise modifying the selection indicator designating the object when local availability of the object exceeds a pre-determined threshold.

13. The one or more non-transitory computer-readable storage media of claim 9, wherein the selection indicator comprises a projected image that is based on a shape of the object.

14. The one or more non-transitory computer-readable storage media of claim 9, wherein the acts further comprise determining an authorization level of a user for purchase prior to generating the order.

15. The one or more non-transitory computer-readable storage media of claim 9, wherein the acts further comprise providing the order to the supplier.

16. The one or more non-transitory computer-readable storage media of claim 9, wherein the acts further comprise queuing orders from one or more unauthorized users for confirmation by an authorized user.

17. The one or more non-transitory computer-readable storage media of claim 9, wherein the acts further comprise queuing a plurality of orders for a pre-determined period prior to providing the plurality of orders to the supplier.

18. One or more non-transitory computer-readable storage media storing computer-executable instructions that, when executed, cause one or more processors to perform acts comprising:

identifying, from an image obtained from a sensor within an environment, a pre-determined gesture directed toward a display within the environment, the display displaying content associated with an object;

determining an environmental context of the display substantially simultaneously with identifying the pre-determined gesture;

determining, based at least in part on the environmental context, that the pre-determined gesture is not associated with the display;

associating, based at least in part on the environmental context, the pre-determined gesture with the object;

determining a selection indicator for presentation within the environment designating the object, the selection indicator including one or more supplier indicators for at least one possible supplier of the object;

causing display of the selection indicator;

receiving, based at least in part on a gesture, a selection of a supplier from the at least one possible supplier; and generating an order for a quantity of the object, wherein the quantity of the object is based, at least in part, on a category associated with the object.

19. The one or more non-transitory computer-readable storage media of claim 18, wherein the acts further comprise:

determining the at least one possible supplier able to fulfill the order; and generating the order for the supplier.

20. The one or more non-transitory computer-readable storage media of claim 18, wherein the acts further comprise designating the object by presenting a visual indicator proximate to the display.

21. The one or more non-transitory computer-readable storage media of claim 18, wherein the acts further comprise:

determining an authorization level associated with a user that indicates a restriction on ordering rights based on at least one of one or more object categories or order price;

queuing a second order for a second quantity of the object based at least in part on the authorization level; and identifying a second user authorized to initiate the second order.

22. The one or more non-transitory computer-readable storage media of claim 18, wherein the acts further comprise queuing the order for a pre-determined period prior to providing the order to the supplier of the object.

23. The one or more non-transitory computer-readable storage media of claim 18, wherein the object is a media file or access rights to the media file.

24. The one or more non-transitory computer-readable storage media of claim 18, wherein the object is a physical good.

* * * * *